United States Patent
Vazquez et al.

(10) Patent No.: US 12,122,296 B2
(45) Date of Patent: *Oct. 22, 2024

(54) SYSTEM AND METHOD PROVIDING VISUAL AIDS FOR WORKPIECE MANIPULATOR POSITIONING AND MOVEMENT PREVIEW PATH

(71) Applicant: Deere & Company, Moline, IL (US)

(72) Inventors: Jose I. Vazquez, Monterrey (MX); Ignacio A. Martinez, Ramos Arizpe (MX); Nikhil D. Tagalpallewar, Pune (IN); Gopal M. Goenka, Pune (IN); Bharat J. Joshi, Pune (IN); Jesus A. Montalvo Urbina, Guadalupe (MX); Daniel Chapa Montemayor, Monterrey (MX); Gerardo Castañeda Gonzalez, Monterrey (MX); Vishwanath V. Patil, Pune (IN)

(73) Assignee: Deere & Company

( * ) Notice: Subject to any disclaimer, the term of this patent is extended or adjusted under 35 U.S.C. 154(b) by 37 days.

This patent is subject to a terminal disclaimer.

(21) Appl. No.: 17/724,598

(22) Filed: Apr. 20, 2022

(65) Prior Publication Data

US 2022/0332249 A1 Oct. 20, 2022

Related U.S. Application Data

(63) Continuation of application No. 17/230,093, filed on Apr. 14, 2021.

(51) Int. Cl.
*B60R 1/00* (2022.01)
*E02F 9/26* (2006.01)
(Continued)

(52) U.S. Cl.
CPC ............... *B60R 1/00* (2013.01); *E02F 9/265* (2013.01); *H04N 5/272* (2013.01); *H04N 7/18* (2013.01);
(Continued)

(58) Field of Classification Search
CPC . B60R 1/00; B60R 2300/20; B60R 2300/307; B60R 2300/8086; E02F 9/265;
(Continued)

(56) References Cited

U.S. PATENT DOCUMENTS 6,765,607 B2    7/2004    Mizusawa et al.
6,970,184 B2    11/2005    Hirama et al.
(Continued)

FOREIGN PATENT DOCUMENTS

FR            3033053 A1    8/2016
WO      2017207522 A1    12/2017

OTHER PUBLICATIONS

Extended European Search Report and Written Opinion issued in European Patent Application No. 22166608.4, dated Oct. 10, 2022, in 08 pages.
(Continued)

*Primary Examiner* — Richard M Camby
(74) *Attorney, Agent, or Firm* — Tucker Ellis LLP

(57) ABSTRACT

A virtual guidance apparatus and method assist an operator to maneuver a loader of a work vehicle for material handling of a workpiece. The virtual guidance apparatus includes a guidance control unit, one or more camera devices mounted on the associated work vehicle and operable to obtain an image of a loader of the associated work vehicle, and a display unit operatively coupled with the guidance control unit and displaying on a screen of the display unit that is viewable from an operator's seat of the associated work vehicle visual aids for guiding the operator in operating the (Continued)

loader to position a boom relative to level ground, to position a tool carrier on an end of the boom, to show a preview of a path of the tool carrier and of tools attached with the tool carrier, and to assist in positioning the workpiece load to be manipulated.

24 Claims, 14 Drawing Sheets

(51) Int. Cl.
*H04N 5/272* (2006.01)
*H04N 7/18* (2006.01)
*G06F 3/04842* (2022.01)
*G06F 3/0488* (2022.01)

(52) U.S. Cl.
CPC ..... *B60R 2300/20* (2013.01); *B60R 2300/307* (2013.01); *B60R 2300/8086* (2013.01); *G06F 3/04842* (2013.01); *G06F 3/0488* (2013.01)

(58) Field of Classification Search
CPC ......... E02F 9/2045; E02F 9/262; E02F 3/434; H04N 5/272; H04N 7/18; G06F 3/04842; G06F 3/0488
See application file for complete search history.

(56) References Cited

U.S. PATENT DOCUMENTS

| | | | |
|---|---|---|---|
| 7,752,778 | B2 | 7/2010 | Schoenmaker et al. |
| 7,797,860 | B2 | 9/2010 | Schoenmaker et al. |
| 9,139,977 | B2 | 9/2015 | McCain et al. |
| 10,106,072 | B2 | 10/2018 | Liñan et al. |
| 10,132,060 | B2 * | 11/2018 | Forcash ................ E02F 9/2045 |
| 10,351,061 | B1 | 7/2019 | Chaudhari |
| 11,401,684 | B2 * | 8/2022 | Berry ................... G05D 1/0221 |
| 2002/0059075 | A1 | 5/2002 | Schick et al. |
| 2002/0125018 | A1 | 9/2002 | Bernhardt et al. |
| 2004/0054457 | A1 | 3/2004 | Kormann |
| 2014/0146167 | A1 * | 5/2014 | Friend .................. G05D 1/0225 348/118 |
| 2014/0151979 | A1 | 6/2014 | Puckett et al. |
| 2016/0312432 | A1 | 10/2016 | Wang et al. |
| 2018/0245316 | A1 * | 8/2018 | Forcash .................... E02F 1/00 |
| 2019/0009817 | A1 | 1/2019 | Bradley et al. |
| 2020/0363815 | A1 | 11/2020 | Mousavian et al. |
| 2021/0043085 | A1 | 2/2021 | Kreiling et al. |
| 2021/0127550 | A1 | 5/2021 | Ohrstrom et al. |
| 2021/0301494 | A1 * | 9/2021 | Berry ...................... E02F 9/205 |
| 2022/0112696 | A1 | 4/2022 | Sud et al. |
| 2022/0332248 | A1 * | 10/2022 | Vazquez ................. E02F 9/265 |
| 2023/0340757 | A1 | 10/2023 | Tagalpallewar et al. |

OTHER PUBLICATIONS

Extended European Search Report dated Aug. 23, 2023 for Application Serial No. 23166423.6 (6 pages).

Final Office Action mailed Feb. 15, 2024 for U.S. Appl. No. 17/230,093 (6 pages).

Non-Final Office Action mailed Oct. 30, 2023 for U.S. Appl. No. 17/230,093 (13 pages).

Non-Final Office Action dated Apr. 19, 2024 for U.S. Appl. No. 17/725,032 (16 pages).

Non-Final Office Action dated Aug. 23, 2024 for U.S. Appl. No. 17/725,032 (18 pages).

* cited by examiner

SYSTEM AND METHOD PROVIDING VISUAL AIDS FOR WORKPIECE MANIPULATOR POSITIONING AND MOVEMENT PREVIEW PATH

CROSS-REFERENCE TO RELATED APPLICATION(S)

This application is a continuation of U.S. Ser. No. 17/230,093, filed Apr. 14, 2021, all of which are incorporated herein by reference.

FIELD OF THE DISCLOSURE

The embodiments herein are directed to methods and systems assisting an operator to visualize and align workpiece manipulator systems operatively coupled with a work vehicle for efficient and safe vehicle and manipulator operation, material handling, and load manipulation. Although the example embodiments will be described as methods and systems for use in providing one or more visualization and alignment previews and one or more preferred orientations of a boom mechanism of a front end loader on a tractor, it is to be appreciated that the embodiments are not limited to those particular uses or applications, and instead may be used anywhere there is a need to provide an operator with a visualization of equipment positioning for helping the operator to view current positions of workpiece manipulator systems and of portions of a vehicle configured to couple with the workpiece manipulator systems as well as to visualize preferred or recommended preview paths for safe and efficient movement of the workpiece manipulator systems.

BACKGROUND

Many machines offer load manipulation that is outside of the strength and reach capabilities of the human body due for example to load size and the natural capacities or incapacities of human workers. Many machines use hydraulic boom mechanisms for example to lift or otherwise manipulate these heavy or large loads. In addition, some machines use such boom mechanisms with a tool carrier coupled to an attachment for handling various materials. However, these boom mechanisms can sometimes block the load from the view of the operator and may also adversely affect the operator's spatial perception of the tool carriers, attachments, and/or material being handled.

Therefore, when spatial perception of the tool carriers, attachments and/or material being manipulated is not easily attainable, many operations are performed by trial and error. This adds to the stress level of the operator, adversely impacts operation time wherein the time to successfully perform the operation may be more than doubled, and can create safety concerns related to unstable material loads and attachments that are not fully coupled to the tool carrier.

Many machines of the type described above include tool carriers supported by multiple parallel linkages of a boom mechanism, wherein the motion of the tool carrier follows a circular path relative to the work vehicle and is quasi-rectilinear as the work vehicle moves relative to the ground. Essentially, points of the tool carrier follow parallel circular lines during movement of the boom mechanism carrying the tool carrier relative to the work vehicle. After the tool carrier is disposed into a desired orientation relative to the work vehicle and absent steering changes in the work vehicle, all points of both the tool carrier as well as the work vehicle follow a quasi-rectilinear path relative to the ground wherein ground unevenness may contribute to imperfect rectilinear motion. Although an operator may rely on the quasi-rectilinear path of the tool carrier carrying a load relative to a target site, the enhanced reach capabilities of these systems oftentimes undermines visibility as spatial perception is difficult for an operator to realize from a single point of view, usually positioned on a seat of the work vehicle disposed on a side of the vehicle opposite from the loader mechanism. The lack of visual feedback can be unnerving at times for the operator adding to stress and also adversely impacting the operation time and safety.

It is therefore desirable to provide systems and methods for assisting an operator to maneuver the work vehicle and the boom mechanism with a tool carrier or an implement or attachment receiver integrated into the boom mechanism (collectively referred to herein as a "loader") relative to the ground under the work vehicle, to one or more attachments and to material to be loaded or manipulated such as to approach, pick up, and deposit the material at locations such as a storage rack, platform or the like.

It is therefore also desirable to provide systems and methods for assisting an operator to maneuver a loader of a work vehicle for material handling by providing visual aids on a screen of a display unit such as for example an overhead display that is viewable from an operator's seat of the work vehicle displaying all or portions of the boom mechanism, tool carrier, one or more attachments and material to be loaded or manipulated to assist in positioning of the work vehicle, the boom mechanism, the tool carrier and/or the one or more attachments relative to the material load. Further, this overhead display may show a preview of a path of the tool carrier relative to the material to be loaded or manipulated.

SUMMARY

The embodiments herein are directed to methods and systems providing alignment aids for assisting an operator to visualize the position of portions of a loader of a work vehicle and attachments detachably coupled to the loader for efficient and safe vehicle operation, material handling, and load manipulation. It is to be understood that material handling and manipulation includes changing material position such as picking up or laying down loads such as bales, pallets or the like, and boom attachment coupling such as when attaching an implement such as bucket or pallet fork to a carrier or receiver on the end of the boom of a loader. "Material handling" as used herein includes and is not limited to any and all operations were material or loads of any type are manipulated, moved, transported, and the like. Although the example embodiments will be described as methods and systems for providing visualization of preferred orientations of a boom mechanism attached to a work vehicle, and providing previews of one or more paths for movement of the work vehicle approaching a load or tool or moving carrying a load, it is to be appreciated that the embodiments are not limited to those particular uses or applications, and instead may be used anywhere there is a need to provide an operator with a visualization of material handling attachments for helping the operator to view current positions of the loader and of the attachments coupled with a carrier of the loader as well as to visualize preferred or recommended paths for coupling these attachments and carrying a load safely and efficiently.

The embodiments herein are directed to methods and systems assisting an operator to visualize and align portions of a loader of a work vehicle and of material handling attachments detachably coupled to the loader relative to the work vehicle itself, relative to the ground under the work vehicle, and to help visualize the position of one or more attachments on the loader and of material to be loaded or manipulated such as to approach a load and/or tool, pick up the tool and/or the load using the tool, and deposit or otherwise place the load or any other material at a desired location such as at or on the ground at a selected location, at or on a storage rack, platform or the like.

The embodiments herein are further directed to methods and systems assisting an operator to visualize and align material handling attachments detachably coupled to a work vehicle for manipulating material loads relative to a storage rack, platform, deposit place or the like, for efficient and safe handling. Although the example embodiments will be described as methods and systems for use in providing a visualization of one or more visual aids such as preview paths and preferred orientations of a boom mechanism attached to a work vehicle and of attachments coupled with the carrier on a boom mechanism of the vehicle, it is to be appreciated that the embodiments are not limited to those particular uses or applications, and instead may be used anywhere there is a need to provide an operator with a visualization of the current position of a loader, and preferred or recommended visual aids such as preview paths for safely and efficiently loading, unloading, or otherwise handling the material load.

The embodiments herein provide for new and improved virtual guidance systems and methods assisting an operator manipulate a loader of a work vehicle to a desired position A virtual guidance system includes a guidance control unit, a camera device operatively coupled with the guidance control unit, and a display unit operatively coupled with the guidance control unit. The guidance control unit includes a processor and a memory device configured to store visual aid data and logic executable by the processor. The camera device is mounted relative to the work vehicle and is operable to obtain an image of the loader of the work vehicle. The display unit is operable to display a viewable image of the loader based on the image obtained by the camera device and to also display a first virtual alignment target image based on the visual aid data. In accordance with an example embodiment, alignment of a selected portion of the viewable image of the loader with the first virtual alignment target image by the operator moving the loader relative to the associated work vehicle results in the loader being manipulated to the desired position.

The embodiments herein provide for new and improved systems and methods for assisting an operator of a work vehicle to maneuver a loader of a work vehicle, wherein the loader includes a boom having one or more articulations and a tool carrier selectively attachable with a working tool, implement or the like having one or more degrees of freedom of movement relative to the boom, for material handling of a workpiece by providing visual aids on a screen of a display unit such as for example an overhead display that is viewable from an operator's seat of the work vehicle for guiding the operation in operating the loader. The visual aids may be augmented in embodiments herein to provide one or more audible aids emitted from a sound generating device near to the operator for assisting by providing audible confirmation to the operator of the work vehicle that the loader handling the material has been maneuvered into one or more orientations and/or positions relative to the workpiece. The visual aids may also or alternatively be augmented in embodiments herein to provide one or more visual aids using color changes provided on the screen of the display unit that is viewable from the operator's seat of the work vehicle for assisting by providing a colorized confirmation to the operator of the work vehicle that the loader handling the material has been maneuvered into one or more orientations and/or positions relative to the workpiece.

The embodiments herein further provide for new and improved systems and methods for assisting an operator of a work vehicle to maneuver a loader of a work vehicle for material handling of a workpiece by providing visual aids on a screen of a display unit such as for example an overhead display that is viewable from an operator's seat of the work vehicle for guiding the operation in operating the loader to position a boom of the loader of the work vehicle relative to the body of the work vehicle such as at a preferred retracted position or the like. Visual aids are provided to the operator to assist in positioning a boom and/or a tool carrier on a free end of the boom with respect to the work vehicle, wherein in an example embodiment, one or more physical markers such as for example crosshair markers, manufacturer's logos, or the like are provided on or at the boom and/or on or at the tool carrier on the end of the boom. Helping the operator to position a boom of the loader of the work vehicle relative to the vehicle body or the like at a desired inclination or raised position off the ground is useful for example when traveling with the vehicle with or without a load such as when traveling to and from a worksite, on a roadway or path, or into or out from a storage facility such as a barn.

Visual aids are also provided to the operator to assist in positioning the boom including the boom and tool carrier on the boom with respect to the ground, wherein in an example embodiment, one or more physical markers such as for example crosshair markers, manufacturer's logos, or the like are provided on or at the boom and/or on or at the tool carrier on the end of the boom. These visual aids are provided to the operator to assist in positioning the boom and/or tool carrier or both with respect to the ground and also in positioning or otherwise aligning the work vehicle with respect to a preferred path for use in approaching a load, wherein in the example embodiment, one or more preview paths are presented having one or more markers displayed over the one or more preview paths and/or overlying the one or more preview paths. This may be useful when maneuvering the vehicle prior to picking up a load.

Visual aids are also provided to the operator to assist in positioning a loader including a boom and a tool carrier on the end of the boom for efficient and safe material handling and load manipulation when picking up a load.

Visual aids are also provided to the operator to assist in positioning a loader including a boom and a tool carrier on the end of the boom for efficient and safe material handling and load manipulation when placing the load onto an associated storage rack, platform or the like.

The visual aids may be augmented in embodiments herein to provide one or more colorized visual aids on a screen of a display unit near to the operator and/or audible aids emitted from a sound generating device near to the operator for assisting the operator of the work vehicle to maneuver the loader into desired positions for material handling of the workpiece such as a load, an attachment, tool or implement to be coupled with a carrier at an end of a boom of the loader or the like.

The embodiments herein still further provide for new and improved systems and methods for assisting an operator of a work vehicle to maneuver a loader of a work vehicle for material handling of a workpiece by providing visual aids on a screen of a display unit such as for example an overhead display that is viewable from an operator's seat of the work vehicle for guiding the operation in operating the loader to position a tool carrier on an end of a boom of the loader relative to the boom.

The embodiments herein yet still further provide for new and improved systems and methods for assisting an operator of a work vehicle to maneuver a loader of a work vehicle for material handling of a workpiece by providing visual aids on a screen of a display unit such as for example an overhead display that is viewable from an operator's seat of the work vehicle for guiding the operation in operating the loader to show a preview of a path of the tool carrier on the boom. In an embodiment the visual aids include one or more preview paths representative of an actual path of one or more tools or implements attached with the tool carrier on the boom. In an embodiment the preview path is provided in the form of guidelines extending between a physical feature of the implement or tool such as a physical marker on the implement or tool and a physical feature of the target or load such as a physical marker on the target or load. In a further embodiment, the preview of the path is representative of a direct virtual path of the tool carrier or of an implement attached with the tool carrier. In an embodiment the preview path is provided in the form of guidelines extending between a coupling feature of the implement or tool and a coupling feature of the target or load. In a still further embodiment, the preview of the path is representative of an indirect virtual path of an implement attached with the tool carrier that is not directly physically visible to the operator, wherein the operator may operate the work vehicle based on the displayed virtual path preview for correctly moving the work vehicle relative to the load. In an embodiment the preview path is provided in the form of guidelines extending between a geometrical feature of the implement or tool and a physical feature of the target or load such as a physical marker on the target or load. In a further embodiment the preview path is provided in the form of guidelines extending between a virtual feature of the implement or tool and a geometrical feature of the target or load such as a physical feature of the target or load offset from a physical coupling feature of the target or load.

In accordance with an aspect of the embodiments, a virtual guidance system includes a guidance control unit, a camera device operatively coupled with the guidance control unit, and a display unit operatively coupled with the guidance control unit. The guidance control unit includes a processor and a memory device configured to store visual aid data and logic executable by the processor. The camera device is mounted relative to the work vehicle and is operable to obtain an image of the loader of the work vehicle 1. The display unit is operable to display a viewable image of the loader based on the image obtained by the camera device and to also display a first virtual alignment target image based on the visual aid data. In accordance with an example embodiment, alignment of a selected portion of the viewable image of the loader with the first virtual alignment target image by the operator moving the loader relative to the associated work vehicle results in the loader being manipulated to the desired position.

In accordance with a further aspect of the embodiments, the camera device of the virtual guidance apparatus is operable to generate loader image data representative of an obtained image of the loader of the work vehicle, and the display unit is operative to receive the loader image data and the visual aid data and to display on a screen of the display unit that is viewable by the operator of the associated work vehicle the virtual alignment target image superimposed on the viewable image of the loader displayed on the screen. In the example embodiment, the virtual alignment target image is representative of a selectable target location on the screen for alignment of a visual marker portion of the viewable image of the loader. In this way, movement of the loader relative to the associated work vehicle to establish an alignment of the visual marker portion of the viewable image of the loader displayed on the screen with the virtual alignment target image displayed at the selectable target location on the screen corresponds to a desired relative physical position between one or more of the loader and the associated work vehicle and/or the loader and ground supporting the associated work vehicle.

In accordance with a further aspect of the embodiments, the virtual alignment target image displayed by the display unit of the virtual guidance apparatus comprises a virtual carrier alignment target image representative of a selectable carrier target location on the screen for alignment of a visual carrier marker portion of the viewable image. In this way, movement of the loader relative to the associated work vehicle to establish an alignment of the visual carrier marker portion of the viewable image of the loader displayed on the screen with the virtual carrier alignment target image displayed at the carrier target location on the screen corresponds to a desired relative physical position between one or more of a tool carrier on an end of the boom of the loader and the associated work vehicle and/or the tool carrier of the loader and ground supporting the associated work vehicle.

In accordance with a still further aspect of the embodiments, the display unit of the virtual guidance apparatus is operable to display on the screen a virtual directional heading image superimposed on the viewable image of the loader based on the image obtained by the camera device, the virtual directional heading image being representative of a preview path on the screen of a movement path to be followed by a tool carrier of the loader for forward movement of the associated work vehicle.

In accordance with yet a further aspect of the embodiments, a virtual guidance apparatus assists an operator manipulate a loader of an associated work vehicle to a desired position. A guidance control unit of the apparatus includes a processor and a memory device operatively coupled with the processor and configured to store visual aid data, and logic executable by the processor. A camera device of the apparatus is operatively coupled with the guidance control unit and is mounted relative to the associated work vehicle and further is operable to obtain an image of the loader of the associated work vehicle. A display unit of the apparatus is operatively coupled with the guidance control unit and is operable to display a virtual directional heading image superimposed on the viewable image of the loader based on the image obtained by the camera device. In the example embodiment, the virtual directional heading image is representative of a preview path on the screen of a movement path to be followed by a tool carrier of the loader for forward movement of the associated work vehicle.

In accordance with yet a still further aspect of the embodiments, a virtual guidance apparatus assists an operator to automatically manipulate a loader of an associated work vehicle to a desired position. A guidance control unit of the apparatus includes a processor and a memory device operatively coupled with the processor and configured to store visual aid data, and logic executable by the processor. A camera device of the apparatus is operatively coupled with the guidance control unit and is mounted relative to the associated work vehicle and further is operable to obtain an image of the loader of the associated work vehicle. The camera is leveraged to work together with the logic executed by the processor to function as an implement position sensor by providing the images captured by the camera to the guidance control unit of the apparatus for image processing to determine the current location of the bucket or other implement relative to the body of the tractor and/or relative to the ground under the tractor. In that way, the camera together with the logic executed by the processor of the guidance control unit of the apparatus may operate as a return to position (RTP) system utilized to automatically return the loader, boom arm, and implements such as a bucket to a pre-stored position in response to operator input. The camera together with the logic executed by the processor effectively provides for directly or indirectly monitoring the position of the bucket relative to the body of the tractor in lieu of the need for physical implement position sensors such as linear transducers or the like to monitor the stroke position of cylinders. The camera provides the boom stroke position and other data related to the inclination of the implement on the boom in an essentially continual manner.

In accordance with yet a still further aspect of the embodiments, a virtual guidance method is provided for assisting an operator of an associated work vehicle to maneuver portions of the associated work vehicle for material handling of an associated workpiece. The virtual guidance method includes obtaining by a camera device mounted relative to the associated work vehicle an image of a loader of the associated work vehicle. The virtual guidance method further includes displaying on a screen of a display unit that is viewable from an operator's seat of the associated work vehicle and that is operatively coupled with a guidance control unit comprising a processor and a memory operatively coupled with the processor the image of the loader of the associated work vehicle obtained by the camera device, and a first virtual alignment target superimposed on the image of the loader obtained by the camera. The first virtual alignment target is representative of a first predetermined target location on the screen for alignment of a first visual marker portion of the image of the loader. In this way, movement of the loader relative to the associated work vehicle to establish a coincidence between the first visual marker portion of the image of the loader displayed on the screen and the first predetermined target location on the screen corresponds to a first predetermined relative physical position between the loader and the associated work vehicle and/or the loader and ground supporting the associated work vehicle.

In an embodiment, the virtual guidance apparatus includes a plurality of cameras, each being provided on a segment of an articulated boom. In particular and in accordance with an example embodiment, a camera is provided for each pivot joint and/or each degree of freedom of movement of an articulated boom. The example embodiments described herein include for ease of description and understanding only a single camera for a loader having a single pivot or degree of freedom of movement.

In some embodiments the input comprises a touchscreen portion of the display unit or a pointer device operatively coupled with the guidance control unit, and the memory of the guidance control unit stores data corresponding to the boom position training signal received by the input during the training.

Other embodiments, features and advantages of the example embodiments for assisting an operator of a work vehicle to maneuver a loader of the work vehicle for material handling of a workpiece by providing visual aids for guiding the operator in operating the loader to position a boom relative to level ground, to position a tool carrier relative to the boom, to show a preview of a path of the tool carrier, and to assist in positioning the workpiece load to be manipulated will become apparent from the following description of the embodiments, taken together with the accompanying drawings, which illustrate, by way of example, the principles of the example embodiments.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION

In the following description reference is made to the accompanying figures which form a part thereof, and in which is shown, by way of illustration, one or more example embodiments of the disclosed systems and methods providing visual aids for loader positioning and preview path for material handling. Various modifications of the example embodiments may be contemplated by on of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" or "one or more of A, B, and/or C" indicates the possibilities of only A, only B, only C, or any combination of two or more of A, B, and C (e.g., A and B; B and C; A and C; or A, B, and C).

Furthermore, in detailing the disclosure, terms of direction, such as "forward," "rear," "front," "back," "lateral," "horizontal," and "vertical" may be used. Such terms are defined, at least in part, with respect to the direction in which the work vehicle or implement travels during use. The term "forward" and the abbreviated term "fore" (and any derivatives and variations) refer to a direction corresponding to the direction of travel of the work vehicle, while the term "aft" (and derivatives and variations) refer to an opposing direction. The term "fore-aft axis" may also reference an axis extending in fore and aft directions. By comparison, the term "lateral axis" may refer to an axis that is perpendicular to the fore-aft axis and extends in a horizontal plane; that is, a plane containing both the fore-aft and lateral axes. The term "vertical," as appearing herein, refers to an axis or a direction orthogonal to the horizontal plane containing the fore-aft and lateral axes.

Figure 1:
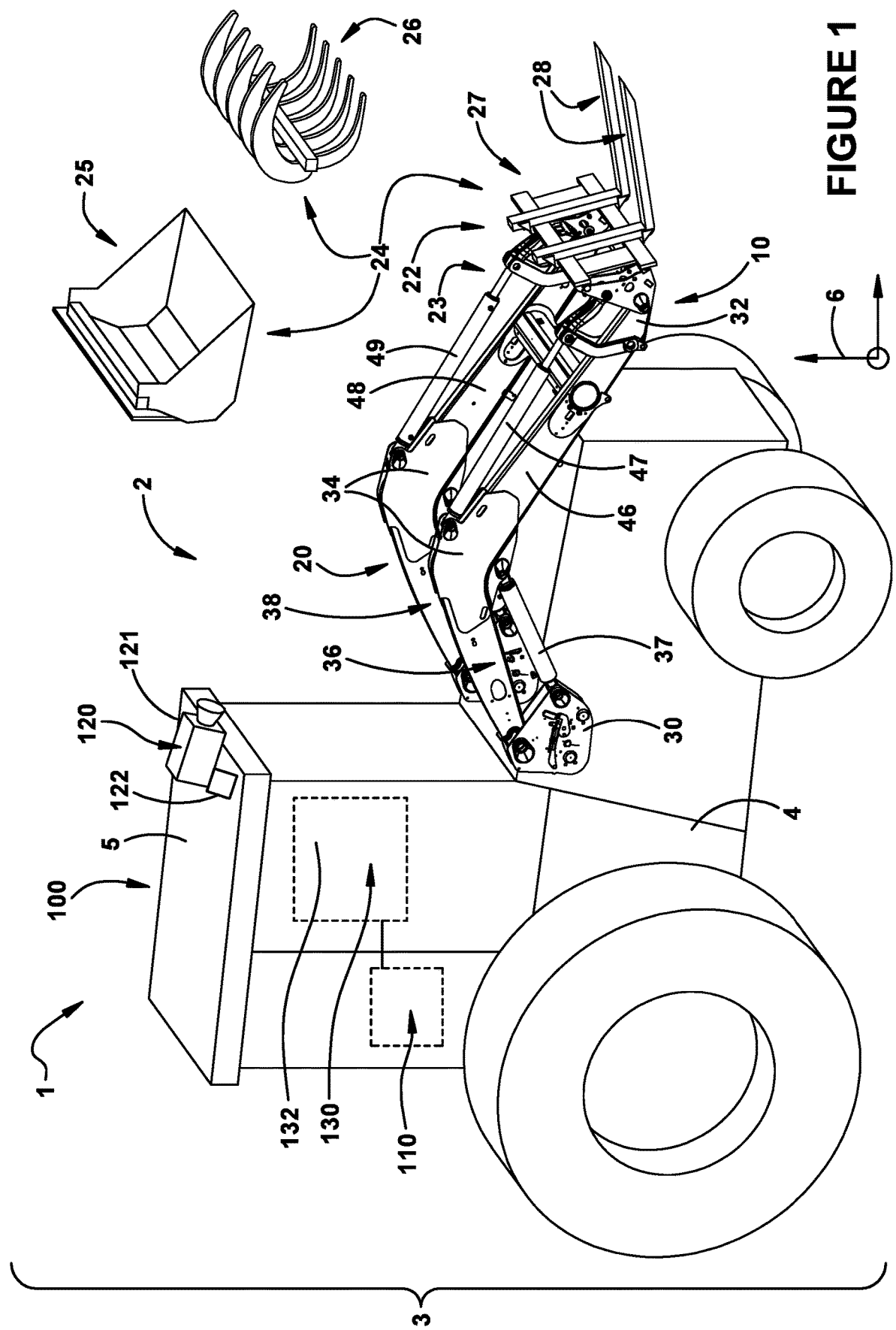
FIG. 1 is a side view of a work vehicle including a virtual guidance apparatus according to example embodiments of the present disclosure.

Referring now to the drawings, wherein the showings are only for the purpose of illustrating the example embodiments only and not for purposes of limiting the same, FIG. 1 illustrates a work vehicle 1 that may be used with the virtual guidance apparatus 100 according to example embodiments of the present disclosure. In the embodiment illustrated, the work vehicle 1 is a tractor 2 but it is to be appreciated that the embodiments herein are not limited to use with tractors or use with any particular mobile material handling equipment. The virtual guidance apparatus 100 of the example embodiments herein may execute or otherwise perform a virtual guidance method providing visual aids for loader positioning and preview path for material handling according to examples of the present disclosure. To provide a useful, albeit non-limiting example, the virtual guidance apparatus 100 of the example embodiments is described below in conjunction with a particular type of work vehicle 1, shown in the form of a tractor 2, equipped with particular types of work implements such as a pallet fork implement 27, a bucket implement 25, a grapple implement 26, etc. included in an front end loader (FEL) attachment. The following notwithstanding, it is emphasized that embodiments of the virtual guidance apparatus 100 may be deployed onboard various other types of work vehicles having one or more movable implements attached thereto.

The virtual guidance apparatus 100 of the example embodiment shown includes an optical system 120 including for example a camera 121. The virtual guidance apparatus 100 may adjust physically and/or electronically one or more operational characteristics of the one or more imaging devices such as the optical system 120 including for example the camera 121, or other optical device(s) in response to movement of various different types of work implements without limitation. The virtual guidance apparatus 100 may be distributed as an integral part of a work vehicle, as an integral part of a loader 10 attachment or other module that may be removably attached to and detached from a work vehicle on an as-needed basis, or as a discrete assembly or multi-component kit that may be installed on an existing work vehicle via retrofit attachment.

In some examples, the camera 121 can be mounted on the cab facing forwards toward the bucket, attachment, or other work tool. For example, the camera can be mounted on the front surface of the cab 5 or the top surface (e.g., roof) of the cab 5. The camera 121 can transmit images (or video signals) wirelessly to a display or though wiring that extends along an arm, boom, or other frame structure of the work vehicle to the display. In other examples, the camera can be mounted on an arm of the work vehicle, including the lower surface, upper surface, or sides of the arm structure used to support the bucket, attachment, or other work tool or device used during operation of the work vehicle. Alternatively, the camera can be mounted on a boom of the work vehicle, including the lower surface, upper surface, or sides of the boom that is commonly used to support the arm and is attached to the main body of the work vehicle.

FIG. 1 is a side perspective view of a tractor 2 including a front end loader 10 attachment and a virtual guidance apparatus 100, as illustrated in accordance with an example embodiment of the present disclosure. The virtual guidance apparatus 100 is only partially shown in FIG. 1 and an example embodiment of which will be described more fully below in conjunction with FIG. 2. First, however, a general description of the tractor 2 is provided to establish an example context in which the virtual guidance apparatus 100 may be better understood. In addition to the loader 10 attachment and the optical system 120, the tractor 2 includes a vehicle body 3 having a chassis 4, and a cab 5. The tractor 2 is generally bilaterally symmetrical about its longitudinal axis, which is parallel to the X-axis identified in FIG. 1 by coordinate legend 6.

In the illustrated embodiment, the work vehicle 1 includes a loader 10 provided for material handling of an associated load. The loader 10 of the work vehicle 1 illustrated includes an articulated boom 20 having a tool carrier 22 on a free end 23 of the boom 20. The tool carrier 22 portion of the loader 10 may be for example a receiver mechanism or other similar device or apparatus provided on the free end 23 of the boom 20 for enabling coupling of an attachment such as an implement or a tool for example with the free end 23 of the boom 20. In this regard, the tool carrier 22 is selectively mutually connectable with one or more various attachments, tools or implements 24 such as for example a bucket implement 25, a grapple implement 26, a pallet fork implement 27 having a set of pallet tines 28, a gripper (not shown), a bail hugger (not shown), a bale spear (not shown), and/or various working devices as may be available and/or desired.

The articulated boom 20 of the loader 10 movably mounts the tool carrier 22 carrying a selected one of the one or more various attachments, tools or implements 24 to a forward portion of the vehicle body 3 and, more specifically, mounts the tool carrier 22 to chassis 4. In the illustrated example, the pallet fork implement 27 is shown attached with the tool carrier 22 but it is to be appreciated that the pallet fork implement 27 may be replaced by any different type of work implement, such as any of the bucket implement 25, the grapple implement 26, the gripper, the bail hugger, the bale spear, all as mentioned above, or any other work implement as necessary and/or desired, in alternative embodiments of the tractor 2. The articulated boom 20 assembly may assume any form capable of moving the work implement 24 relative the vehicle body 4 in response to operator commands. In the example embodiment shown in FIG. 1, the boom assembly 20 includes a system of linkages, hydraulic cylinders, plumbing lines (not shown), and other components suitable for this purpose. More specifically, the boom assembly 20 includes an aft bracket set 30 affixed to the vehicle body 4, a forward bracket set 32 to which the tool carrier 22 carrying the pallet fork implement 27 is pivotally attached, and an intermediate or mid bracket set 34 between the aft and forward bracket sets 30, 32. Twin lift arms 36, 38 pivotally attach the aft bracket set 30 with the mid bracket set 34, which is, in turn, attached with the forward bracket set 32 by twin implement arms 46, 48. Lift cylinders 37, 39 (only one of which can be seen) are further coupled between the aft bracket set 30 and the mid bracket set 34, while bucket cylinders 47, 49 are coupled between the mid bracket set 34 and the forward bracket set 33.

In the example embodiment the camera 121 is mounted on the cab facing forwards toward the bucket, attachment, or other work tool so that all of the lift arms 36, 38, the implement arms 46, 48, the aft, mid, and forward bracket sets 30, 34, 32, and any implements attached with the boom are within the field of view of the imaging system 120. Additionally, embodiments the virtual guidance apparatus 100 may adjust one or more operational characteristics of one or more imaging devices such as an optical system 120 including for example a camera 121, or other optical device(s) in response to movement of various different types of work implements without limitation for this purpose.

The loader 10 attachment further includes other features, such as hydraulic lines and control valves, which are not shown in FIG. 1 for simplicity. When the loader 10 is mounted to the vehicle body 4, the hydraulic lines of the loader 10 are fluidly connected to a pressurized hydraulic fluid supply on the tractor 2 in a manner permitting an operator seated within the cab 5 to control the cylinders 37, 39, 47, and 49. Beginning from the ground position shown in FIGS. 6A, 6B, 7, and 8, an operator may command the boom assembly 20 of the loader 10 to lift the pallet fork implement 27 carried on the tool carrier 22 as shown by controlling the lift cylinders 37, 39 to extend. As the lift cylinders 37, 39 retract, the boom 20 comprising the pallet fork implement 27 carried on the tool carrier 22 is lowered from the full height position shown in FIG. 3 to the lowered position shown in FIGS. 4, 5A, 5B, 6A, and 6B. In the process of moving from the full height position to the lowered position, the boom 20 travels through the intermediate or mast level position shown in FIG. 1. Similarly, as the bucket cylinders 47, 49 extend in response to operator commands, the boom assembly 20 tilts the pallet fork implement 27 carried on the tool carrier 22 from the upright position shown in FIGS. 4, 5A, and 5B through an intermediate position to the forward-facing lift position shown in FIGS. 6A, 6B, and 7. Conversely, the operator may control the boom assembly 20 to stroke cylinders 37, 38, 47, 48 in a manner opposite to that just described to return the pallet fork implement 27 from the grounded, forward-facing lift position shown in FIGS. 6A, 6B, and 7 to the raised full height position shown in FIG. 3.

It is to be appreciated that the motion of the cylinders 37, 39, 47, and 49 may be controlled directly by operator manipulation of various levers, pedals and/or other human interface device(s) operatively coupled with hydraulic control components of the system, and further that the motion of the loader 10 may be indirectly controlled by the operator rendering motion commands to via the virtual guidance apparatus 100 which in turn may operate the various hydraulic control components of the system for moving the cylinders 37, 39, 47, and 49 thereby effecting the desired movement of the loader 10. It is still further to be appreciated that the motion of the cylinders 37, 39, 47, and 49 may be controlled by the virtual guidance apparatus 100 automatically and/or semi-automatically in response to generalized operator commands such as for example return to position (RTP) commands wherein for example the virtual guidance apparatus 100 may function in an RTP mode to automatically return the boom 20 overall, portions of the boom 20 such as for example the lift arms 36, 38 and/or the implement arms 46, 48, the various attachments, tools or implements 24 carried on the tool carrier 22, to one or more pre-stored position(s) in response to operator input.

In the example embodiment shown in the Figures, the implements 24 are moved by the boom 20 along a vertical plane containing or parallel to the longitudinal axis of the body 4 of the tractor 2 (corresponding to an X-Y plane in coordinate legend 6). The optical system 120 thus need only have a field of view (vertical in the example embodiment) rotatable about a single rotational axis to remain trained on the implements 24 throughout the range of motion of the loader 10 relative to the body 4 of the tractor 2. For the camera 121 shown this rotational axis is parallel to the lateral axis of the tractor 2; a "lateral axis" of the tractor 2 (or other work vehicle) defined as an axis extending within a horizontal plane (an X-Z plane in coordinate legend 6) and perpendicular to the longitudinal axis of the tractor 2. Stated differently, a lateral axis of tractor 2 is parallel to the Z-axis in coordinate legend 6, and camera 121 may be selectively rotatable in a further example embodiment about a rotational axis likewise parallel to the Z-axis, although in the example embodiment described herein the camera 121 remains fixed relative to the work vehicle 1 and in particular relative to the cab 5 of the tractor 2 and, as such remains fixed relative the a rotational axis likewise parallel to the Z-axis. In other embodiments wherein the virtual guidance apparatus 100 is deployed onboard a work vehicle including a backhoe or other implement that is rotatable about a horizontal axis (corresponding to the Y-axis in coordinate legend 6), the camera 121 or other optical device or optical devices included within the virtual guidance apparatus 100 may be selectively rotatable about multiple axes including an axis parallel to the horizontal axis.

The camera 121 or other optical device or devices included with the virtual guidance apparatus 100 may also be imparted with additional degrees of freedom in further embodiments. For example, the camera 121 may be moved to translate along any axis in three dimensional space, as appropriate to better visually capture the pallet fork implement 27 or other implement 24 throughout its full range of motion relative to the body 4 of the tractor 2. For example, and as may be appreciated, the camera 121 may be mounted on a telescopic post 122 that extends vertically upward when the pallet fork implement 27 or other implement 24 is moved into the full height position to provide a better vantage point for observation of markers on the pallet fork implement 27 or other implement 24 as will be described below to minimize the degree to which the boom assembly 20 visually obstructs the camera's view of the pallet fork implement 27 or other implement 24. In addition, the virtual guidance apparatus 100 may electronically adjust one or more operational characteristics of the one or more imaging devices such as the optical system 120 including for example the camera 121, or other optical device(s) in response to movement of various different types of work implements without limitation to minimize the degree to which the boom assembly 20 visually obstructs the camera's view of the pallet fork implement 27 or other implement 24.

The articulated boom 20 may be maneuvered such as by actuating various hydraulic cylinders 37, 39, 47, 49 to extend or retract and to lower or raise an articulated boom 20 relative to the work vehicle so that the tool carrier 22 may be positioned for coupling the boom 20 with the one or more various implements 24. The tool carrier 22 disposed on the end of the boom 20 collectively forms a loader 10 in accordance with the example embodiments. In an example embodiment herein, the one or more various implements 24 may be initially considered as a workpiece prior to being coupled with the tool carrier 22 of the loader 10 wherein an operator may desire for the one or more various implements 24 and the tool carrier 22 to be mutually latched joined or otherwise mechanically coupled prior to performing a material handling task or the like. As an example, an operator may wish to couple the pallet fork implement 27 with the tool carrier 22 prior to proceeding to approach, lift, and place a palletized load at a desired location. The visual aids described herein are developed by the system and provided to the operator of the associated work vehicle 1 for assisting in properly locating the tool carrier 22 on the free end 23 of the boom 20 at a desired height relative to the ground, and also for providing further visual aids for assisting in properly tilting the tool carrier 22 to a desired orientation or inclination for enabling coupling of the carrier 22 with the selected attachment 24, and further for positioning the work vehicle 1 relative to the selected implement 24 for moving the vehicle 1 supporting the tool carrier 22 into a coupling relationship with the selected implement 24 for mutually connecting the tool carrier 22 with the selected implement 24.

In addition, the visual aids described herein are developed by the system and provided to the operator of the associated work vehicle 1 for properly locating the tool carrier 22 on the free end 23 of the boom 20 at a desired height relative to the ground for training the system for RTP operation, and also for providing further visual aids for assisting in properly tilting the tool carrier 22 to a desired orientation or inclination for enabling coupling of the carrier 22 with the selected attachment 24 for training the system for the RTP operation, and further for positioning the work vehicle 1 relative to the selected implement 24 for moving the vehicle 1 supporting the tool carrier 22 into a coupling relationship with the selected implement 24 for mutually connecting the tool carrier 22 with the selected implement 24 for training the system for the RTP operation.

After the tool carrier 22 disposed on the end of the boom 20 is moved to the desired position and coupled with the one or more various implements 24, further visual aids described herein are developed by the system and provided to the operator of the associated work vehicle 1 for assisting in properly positioning the loader 10 with the implement 24 coupled therewith, for engaging with an associated load or other workpiece (not shown) such as for example to pick up the load using the bucket implement 25, the grapple implement 26, the pallet fork implement 27 or the like. In an embodiment a preview path is provided in the form of guidelines extending between a physical feature of the implement or tool such as a physical marker on the implement or tool and a physical feature of the target or load such as a physical marker on the target or load. In a further embodiment, the preview of the path is representative of a direct virtual path of the tool carrier or of an implement attached with the tool carrier. In an embodiment the preview path is provided in the form of guidelines extending between a coupling feature of the implement or tool and a coupling feature of the target or load. In a still further embodiment, the preview of the path is representative of an indirect virtual path of an implement attached with the tool carrier that is not directly physically visible to the operator, wherein the operator may operate the work vehicle based on the displayed virtual path preview for correctly moving the work vehicle relative to the load. In an embodiment the preview path is provided in the form of guidelines extending between a geometrical feature of the implement or tool and a physical feature of the target or load such as a physical marker on the target or load. In a further embodiment the preview path is provided in the form of guidelines extending between a virtual feature of the implement or tool and a geometrical feature of the target or load such as a physical feature of the target or load offset from a physical coupling feature of the target or load.

After the load is engaged and raised using the loader 10 with the implement 24 coupled therewith, further visual aids described herein are developed by the system and provided to the operator of the associated work vehicle 1 for assisting in properly placing the load at a desired location such as on associated storage rack, platform or the like. In an embodiment a preview path is provided in the form of guidelines extending between a physical feature of the load as a physical marker on the load and a physical feature of the target location such as a physical marker on the target location. In a further embodiment, the preview of the path is representative of a direct virtual path of the load attached carried by the tool. In an embodiment the preview path is provided in the form of guidelines extending between a coupling feature of the load and a coupling feature of the target location. In a still further embodiment, the preview of the path is representative of an indirect virtual path of the carried load that is not directly physically visible to the operator, wherein the operator may operate the work vehicle based on the displayed virtual path preview for correctly moving the work vehicle carrying the load relative to the desired unloading location. In an embodiment the preview path is provided in the form of guidelines extending between a geometrical feature of the load and a physical feature of the target location such as a physical marker on the target location. In a further embodiment the preview path is provided in the form of guidelines extending between a virtual feature of the load and a geometrical feature of the target location such as a physical feature of the target location offset from a physical coupling feature of the target location.

In accordance with an example embodiment, the virtual guidance apparatus 100 includes a guidance control unit 110, an optical system 120 such as a camera device 121 mounted on the associated work vehicle 1 and operatively coupled with the guidance control unit 110, and a display unit 130 operatively coupled with the guidance control unit 110. As appearing herein, the term "camera device" refers to an optical device, a camera system, electrical light, or other device that generates and/or detects visible light or other electromagnetic radiation. The guidance control unit 110 includes a processor 204 (FIG. 2) and a memory device 210 (FIG. 2) operatively coupled with the processor in a manner to be described in greater detail below. The memory device 210 stores visual aid logic 211 (FIG. 2) executable by the processor 204 to provide virtual guidance for assisting an operator of the work vehicle to maneuver the loader 10 to a desired position relative to the work vehicle and relative to the ground, and for providing virtual guidance assistance for material handling of a workpiece such as and including during approaching and attaching the carrier 22 with a selected implement 24, and during picking up and dropping off and/or placement of a load in accordance with the example embodiments. The memory device 210 also stores visual aid data 213 (FIG. 2) that may be generated with operator assistance or input and then used for generating one or more virtual alignment target images on a display screen based on the visual aid data.

The display unit 130 can be positioned in the cab 5 or elsewhere on the work vehicle. The display unit 130 can be positioned so as to be viewable by the operator while the operator manipulates the work vehicle's controls to perform a task. And the display unit 130 can be positioned so as not to hinder the opening or closing of any latches, hatches, windows, or doors in the cab. In some examples, the display can be mounted on the exterior of the cab 5, such as to a rollover protection structure (ROPS), via a mounting device. This can enable the operator to view the display while operating the controls of the work vehicle. In other examples, the display unit 130 can be positioned in the cab 5, for example, by using a vertical support pillar that forms the structure of the ROPS. The vertical support pillar can be located in front of the operator or behind the operator while the operator is seated in the cab 5. Additionally or alternatively, the display unit 130 can be positioned in the cab using a cross member that spans across a vertical support pillar. The cross member can be positioned in front of, behind, or on the sides of the operator while the operator is seated in the cab 5. The display unit 130 can additionally or alternatively be positioned on a supporting structure inside the cab 5 for the controls (e.g., pilot controls) used to operate the work vehicle 1. The controls can control the rotation of the work vehicle 1; the boom 20, arm, or work tool 24; or any combination of these. In some examples, the display unit 130 can be an existing monitor in the work vehicle that typically shows other information, such as operating parameters (e.g., engine speed, fuel level, and engine temperature) of the work vehicle. In such an example, the monitor may be modified to perform the functionality of the display unit 130.

The camera device 121 of the virtual guidance apparatus 100 is operable to obtain an image of the loader 10 of the associated work vehicle 1 and to generate loader image data representative of the obtained image of the loader 10. The display unit 130 is operatively coupled with the guidance control unit 110, and receives the loader image data and the visual aid data 213. The display unit 130 displays on a screen 132 of the display unit that is viewable by the user from a user station of the associated work vehicle 1 a viewable image of the loader 10 of the associated work vehicle based on the loader image data. The display unit 130 also displays on the screen 132 a first virtual alignment target image based on the visual aid data 213. In the example embodiment, the first virtual alignment target image is a static display and is rendered on the screen 132 superimposed over the dynamic viewable image of the loader. The first virtual alignment target image is representative of a first selectable target location on the screen 132 for alignment of a first visual marker portion of the viewable image of the loader.

In accordance with an embodiment the first virtual alignment target image representative of the first selectable target location to be displayed on the screen is digitally compared by logic executed by the processor of the guidance control unit with the first visual marker portion of the viewable image of the loader in order to determine that the loader has reached a desired conformation relative to the tractor and/or relative to the ground during the automatic or semi-automatic RTP operational functionality off the subject system.

It is to be appreciated that although only a single camera device 121 is shown for ease of illustration mounted to the work vehicle 1 at the position shown, the camera device 121 shown is merely representative of a set of one or more cameras that may include several connected cameras that can be mounted on or near the vehicle or anywhere as may be necessary or desired such as for example on other areas of the work vehicle or on portions of the loader itself in order to obtain as many images of one or more targets on the boom and/or on the tool carrier as may be necessary and/or desired for providing images of a full relevant range of movement or motion of the loader.

In an embodiment, the virtual guidance apparatus may include a plurality of such camera devices 121 comprising the optical system 120 of the example embodiment, each being provided on and/or oriented towards a segment of the loader 10 in the form of an articulated boom 20. In particular and in accordance with an example embodiment, a camera may be provided for each pivot joint and/or each degree of freedom of movement of the articulated boom 20. The example embodiment described herein includes for ease of description and understanding only a single camera device 121 for a loader having a single pivot or degree of freedom of movement.

Figure 2:
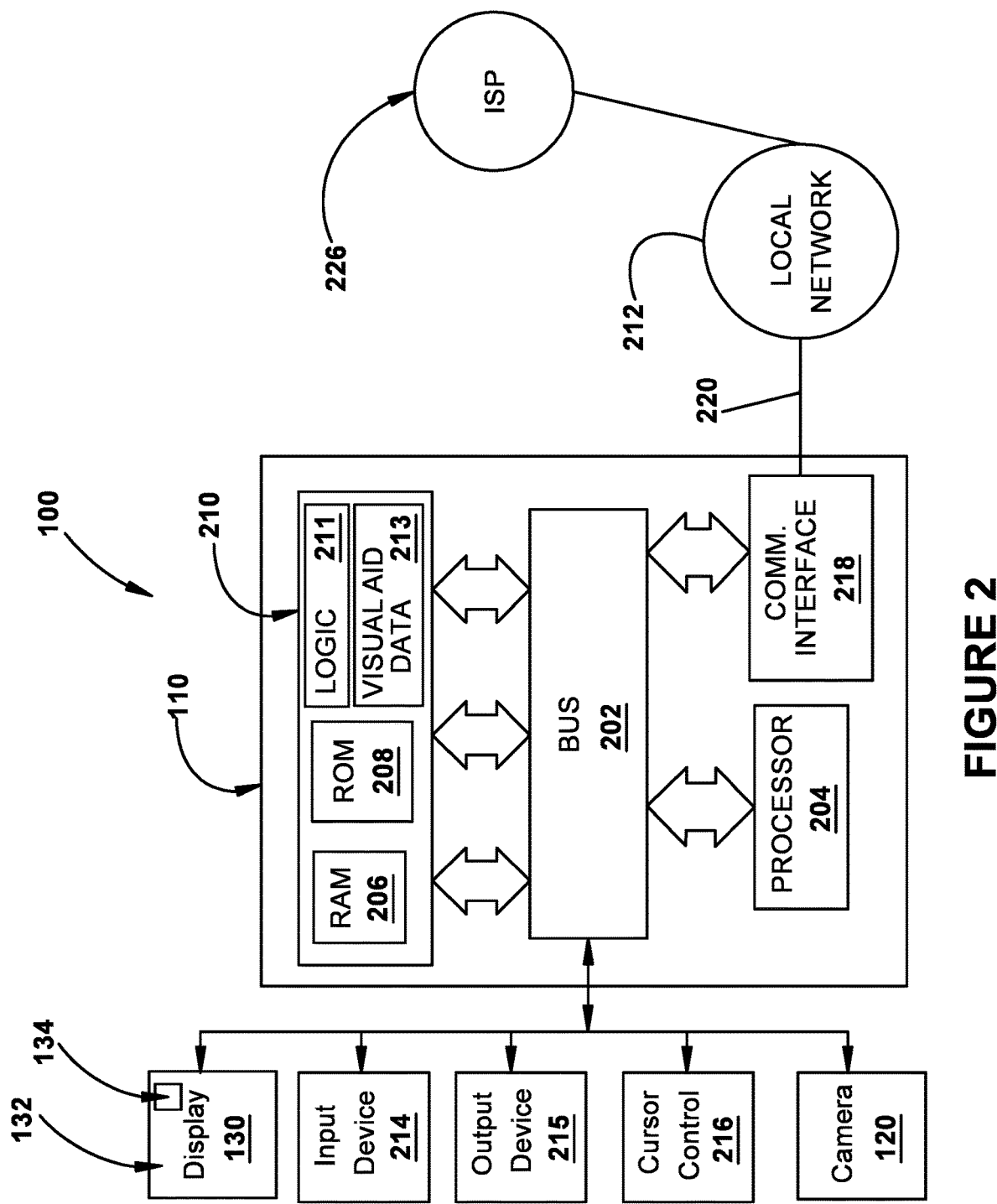
FIG. 2 is a block diagram that illustrates a representative virtual guidance apparatus according to the example embodiments.

FIG. 2 is a block diagram that illustrates a representative virtual guidance apparatus or controller 100 according to the example embodiments. The controller is suitable for executing embodiments of one or more software systems or logic modules that perform the virtual guidance method for assisting an operator of an associated work vehicle to maneuver portions of the associated work vehicle for material handling of an associated workpiece according to the subject application such as may be useful when traveling with the vehicle without a load, when maneuvering the loader to couple an implement onto a tool carrier on the free end of a boom of the loader, when maneuvering the vehicle with the attached implement prior to picking up a load, for efficient and safe material handling and load manipulation when picking up a load, and for efficient and safe material handling and load manipulation when placing the load onto an associated storage rack, platform or the like.

The example system includes a bus 202 or other communication mechanism for communicating information, and a processor 204 coupled with the bus for processing information. The computer system includes a main memory, such as random access memory (RAM) 206 or other dynamic storage device for storing information and instructions to be executed by the processor 204, and read only memory (ROM) 208 or other static storage device for storing static information and instructions for the processor 204. A storage device 210 is also suitably provided for storing visual aid logic 211 comprising instructions for execution by the processor, and other information including for example data and instructions for execution by the processor for obtaining and displaying visual aids on a screen of the display unit that is viewable from an operator's seat of the associated work vehicle. The visual aids are displayed for helping to guide the user in operating the loader to position a boom relative to the work vehicle, to position the boom relative to level ground, to position the tool carrier 22 on the free end 23 thereof relative to the one or more various attachments or implements 24 to be coupled with the carrier 22, to position the one or more various attachments or implements 24 relative to the boom and/or relative to the ground or to an associated load to be picked up, to show a preview of a path tool carrier 22, to assist in positioning the workpiece load to be manipulated, and to drop off the load in or on an associated storage rack, platform or the like. The storage device 210 may further store visual aid data 213 used for generating in the example embodiment one or more static virtual alignment target images superimposed on a dynamic viewable image of the loader displayed on the screen 132, wherein the one or more virtual alignment target images displayed on the screen 132 are representative of selectable target locations on the screen 132 for alignment of visual marker portions of the viewable image of the loader. The visual marker portions of the viewable image of the loader may be representative of images of one or more physical markers such as for example crosshair markers, manufacturer's logos, or the like that are provided on or at areas of the boom and/or on or at areas of the tool carrier on the end of the boom for example.

The example embodiments described herein are related to the virtual guidance apparatus or controller 100 performing a method providing visual aids that assist an operator of an associated work vehicle to maneuver a loader of the associated work vehicle to couple an implement or other attachment onto a tool carrier of the loader, and for material handling of an associated workpiece load using the implement on the loader. According to one implementation, information for the visual aids to be displayed on the screen of the display unit are provided by the virtual guidance apparatus or controller 100 in response to the processor 204 executing the visual aid logic 211 comprising one or more sequences of instructions of logic modules contained in main memory 206. Such instructions may be read into main memory 206 from another computer-readable medium, such as storage device 210. Execution of the sequences of the visual aid logic 211 instructions contained in storage device 210 and/or main memory 206 causes the processor 204 to perform the process steps described herein. In an alternative implementation, hard-wired circuitry may be used in place of or in combination with software instructions to implement the invention. Thus implementations of the example embodiments are not limited to any specific combination of hardware circuitry, software, logic, or combinations of hardware, software, and/or logic.

In accordance with the descriptions herein, the term "computer-readable medium" as used herein refers to any non-transitory media that participates in providing visual aid logic 211 instructions to the processor 204 for execution. Such a non-transitory medium may take many forms, including but not limited to volatile and non-volatile media. Non-volatile media includes, for example, optical or magnetic disks. Volatile media includes dynamic memory for example and does not include transitory signals, carrier waves, or the like. Common forms of computer-readable media include, for example, a floppy disk, a flexible disk, hard disk, magnetic tape, or any other magnetic medium, a CD-ROM, any other optical medium, punch cards, paper-tape, any other physical medium with patterns of holes, a RAM, PROM, and EPROM, a FLASH-EPROM, any other memory chip or cartridge, or any other tangible non-transitory medium from which a computer can read.

In addition and further in accordance with the descriptions herein, the term "logic", as used herein with respect to the Figures, includes hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components.

The virtual guidance apparatus or controller 100 further includes a communication interface 218 coupled with the bus 202 which provides a two-way data communication coupling to a network link 220 that is connected to local network 212 such as for example a local network of the work vehicle 1 such as a Controller Area Network (CAN) bus or the like. The communication interface 218 may be a controller area network (CAN) card to provide a data communication connection to a compatible CAN bus. As another example, communication interface 218 may be a local area network (LAN) card to provide a data communication connection to a compatible LAN. For example, communication interface 218 may be an integrated services digital network (ISDN) card or a modem to provide a data communication connection to a corresponding type of telephone line. Wireless links may also be implemented. In any such implementation, communication interface 218 may be a wireless receiver/transmitter, i.e. a transceiver operable to send and receive electrical, electromagnetic, radio frequency (RF), and/or optical signals that carry data streams such as digital data streams representing various types of information.

Network link 220 typically provides data communication through one or more networks to other data devices. For example, network link 220 may provide a connection through a local network to a diagnostic host computer (not shown) of the like for supporting configuration of the system as desired or necessary. An Internet Service Provider (ISP) 226 may provide data communication services indirectly through the Internet via the network 212 or directly through the network link 220.

The example virtual guidance apparatus or controller 100 can send messages and receive data, including program code, through the network(s), network link 220 and communication interface 218. In the Internet-connected example embodiment, the virtual guidance apparatus or controller 100 is operatively connected with a plurality of external public, private, governmental or commercial servers (not shown) configured to execute a web application in accordance with example embodiments. The example virtual guidance apparatus or controller 100 suitably includes several subsystems or modules to perform the virtual operator's guidance as set forth herein. A benefit of the subject application is to provide improved guidance by displaying guidance instructions on a screen 132 of a display unit 130 that is viewable from an operator's seat of the associated work vehicle for helping the operator to view current positions of the loader and tool mechanisms as well as to visualize preferred or recommended paths for movement of the loader and tool mechanisms to safely and efficiently couple the tool with the tool carrier and to safely and efficiently load, unload, or otherwise handle material. An output device 215 may also be provided such as in the form of a sound generating device such as a speaker to help improve guidance assistance by generating audible guidance instructions in the form of audible instructions and/or suitable instructional noises such as beeps, voice messages or the like that can be heard from an operator's seat of the associated work vehicle for helping the operator to be alerted to current positions of the mechanisms as well as to be audibly instructed of preferred or recommended paths for movement of the loader and tool mechanisms to safely and efficiently load, unload, or otherwise couple the desired implement 24 with the carrier 22, and also to handle the material using the implement 24 received on the carrier 22.

The example embodiment of the virtual guidance apparatus further includes an input device 214 operatively coupled with the guidance control unit. The input device 214 may be used during a training of the virtual guidance apparatus for receiving a boom position training signal representative of the first predetermined target location on the screen for alignment of the boom target device in the image of the loader to establish the predetermined relative physical position between the boom portion of the loader and the ground supporting the associated work vehicle. In an example embodiment the input device 214 may include a touchscreen portion 134 of the display unit 130, a pointer device 216 operatively coupled with the guidance control unit, or any other device or means of communicating training and other information to the control unit 110 of the virtual guidance assist apparatus 100.

In an example embodiment during system training, the operator may first position the boom 20 to a desired position relative to the vehicle and/or relative to the ground, then drag and drop a virtual indicia movable on the touchscreen 134 using a pointer or finger onto a selected portion of the image of boom on the screen 132 while the boom is in the desired position, wherein the virtual indicia comprises the boom position training signal representative of a selectable target location on the screen for alignment of the boom target device in the viewable image of the loader to establish a desired relative physical position between the boom portion of the loader and the vehicle or to the ground supporting the associated work vehicle. In an example embodiment, the virtual indicia may be a crosshair for example. In a further example embodiment, the virtual indicia may be a visual symbol such as a logo, for example. In yet a further example, the virtual indicia may be a static image capture of the boom disposed in a selected desired position relative to the vehicle and/or relative to the ground wherein a subsequent superposition of the static captured image of the boom in the selected desired position with dynamic images of the boom being moved during use of the vehicle cold be used to establish an accurate boom repositioning to the desired position upon movement of the boom to realize a coincidence of the dynamic boom image being displayed on the screen with the static boom target image also being displayed.

Further in an example embodiment, the operator may position the tool carrier 22 in a desired position relative to the boom 20, then drag and drop the virtual indicia movable on the touchscreen 134 onto a selected portion of the image of boom on the screen 132 while the tool carrier 22 is in a desired position relative to the boom 20, wherein the virtual indicia comprises the carrier position training signal representative of a selectable target location on the screen for alignment of the carrier target device in the viewable image of the loader to establish a desired relative physical position between the carrier portion of the boom and the vehicle, the ground supporting the associated work vehicle, and/or relative to the boom 20. In an example embodiment, the virtual indicia may be a crosshair for example. In a further example embodiment, the virtual indicia may be a visual symbol such as a logo, for example. In yet a further example, the virtual indicia may be a static image capture of the tool carrier 22 disposed in the desired position relative to the boom 20.

Figure 3:
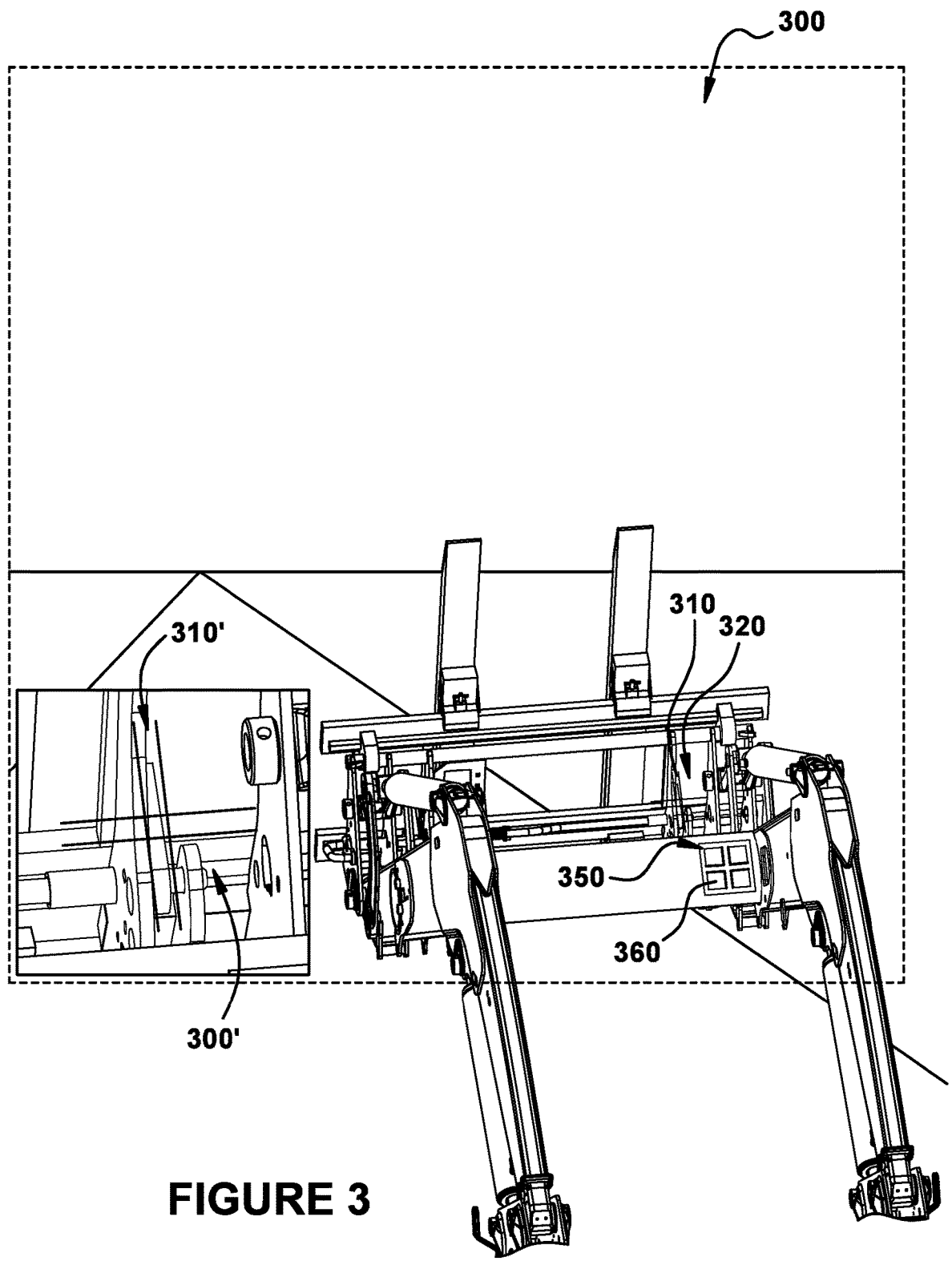
FIGS. 3 and 4 show visual aids useful to position the boom of a work vehicle relative to ground supporting the work vehicle in accordance with an example embodiment.
Figure 4:
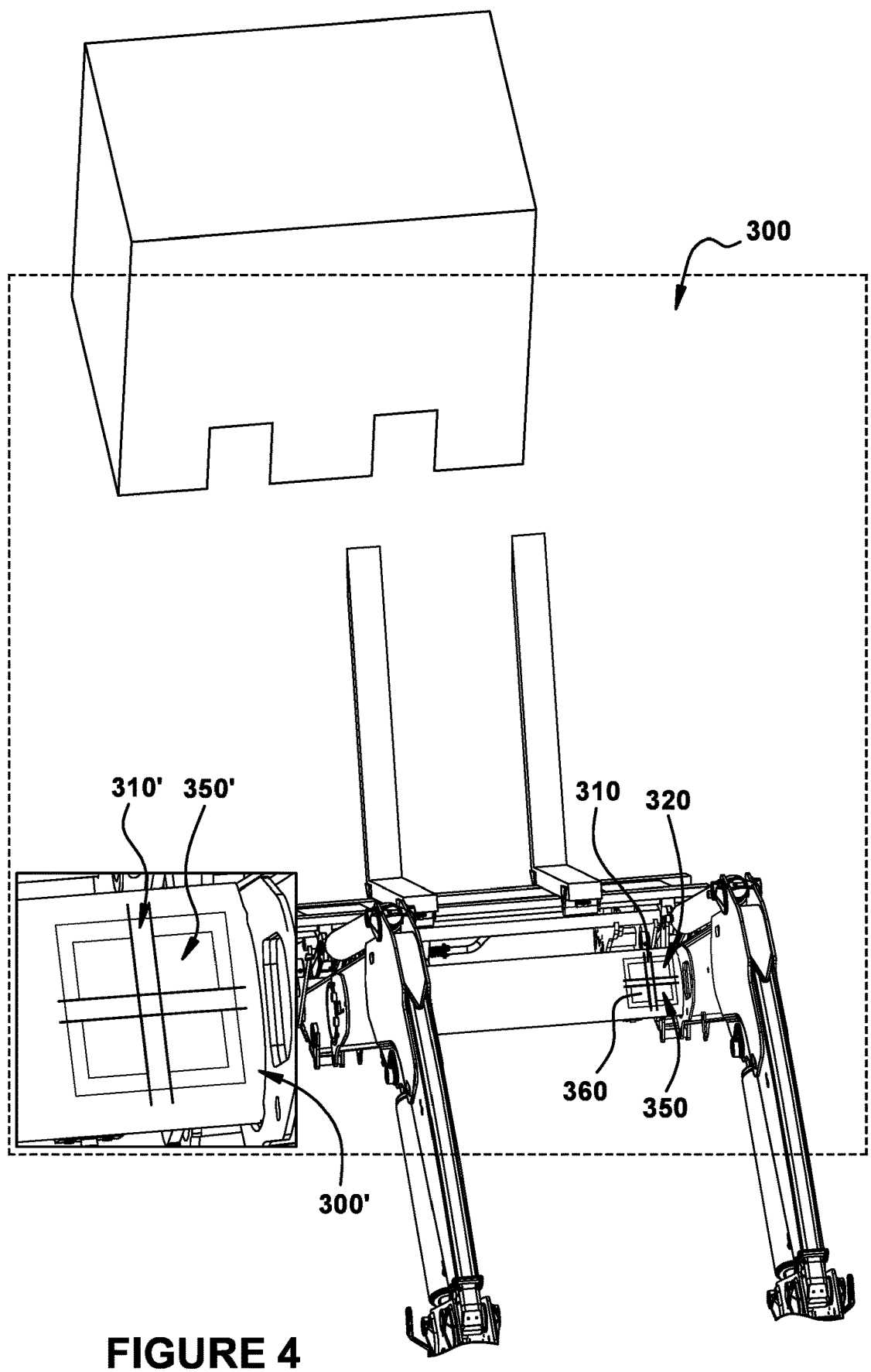

Virtual Alignment Target Image Aids Useful to Position Boom Relative to Work Vehicle and/or Relative to Ground FIGS. 3 and 4 show virtual alignment target image visual image aids displayed by the virtual guidance apparatus 100 in the form of guiding lines useful to assist in positioning the boom 20 relative to ground supporting the associated work vehicle in accordance with an example embodiment. Although the guiding lines of the example embodiment are cross-hair-type guiding lines, as will be described further herein, it is to be appreciated that other forms of guiding lines, shapes, or other forms or combination of forms such as for example, a silhouette of the boom of the loader arm in the one or more desired position(s), a visual symbol such as a fanciful symbol or a manufacturer's logo or the like may be used as necessary or desired. With reference now to those Figures and with continued reference to FIGS. 1 and 2, as described above, a camera device 121 operatively coupled with the guidance control unit 110 is mounted on the associated work vehicle and is operable to obtain an image of the loader 10 of the associated work vehicle 1 and to generate loader image data representative of the obtained image of the loader 10. The display unit 130 operatively coupled with the guidance control unit 110 receives the loader image data and the visual aid data 213 stored in the memory device 210 and displays a viewable image 300 of the loader 10 of the associated work vehicle based on the loader image data. The viewable image 300 is displayed on the screen 132 of the display unit 130 that is viewable from an operator's seat of the associated work vehicle. The display unit 130 also displays a first virtual alignment target image 310 superimposed on the viewable image 300 of the loader obtained by the camera. The first virtual alignment target image 310 is representative of a first predetermined target location 320 on the screen for alignment of a first visual marker portion 350 of the viewable image 300 of the loader 10.

As will be described below, the first visual marker portion 350 is a portion of the viewable image 300 corresponding to an image of a physical boom target device 360 disposed on the boom and imaged by the camera device 121. The viewable image 300 in the example embodiment is dynamically displayed on the display unit 130 as the user operates the vehicle to move the loader 10 and therefore this image together with the first visual marker portion 350 of the viewable image 300 change together with the movement of the loader 10 being imaged by the camera device 121. However, the first virtual alignment target image 310 superimposed on the moving image 300 including the visual marker portion 350 of the moving image is statically displayed on the display unit 130. In that way, an alignment of the first visual marker portion 350 of the viewable image 300 with the first virtual alignment target image 310 effected by the operator moving the loader 10 relative to the associated work vehicle 1 results in the loader being manipulated to the desired position. In an example embodiment, the alignment of the first visual marker portion 350 of the viewable image 300 with the first virtual alignment target image 310 is obtained by achieving a coincidence on the screen 132 of the display unit 130 between the first visual marker portion 350 and the first virtual alignment target image 310. In this regard, FIG. 3 shows a malalignment between the first visual marker portion 350 and the first virtual alignment target image 310 while the loader 10 is being manipulated by the operator of the vehicle and while it is being imaged by the camera device 121. FIG. 4 shows an alignment in the form of a coincidence between the first visual marker portion 350 and the first virtual alignment target image 310 indicating that the loader 10 has been manipulated by the operator of the vehicle to its desired location relative to the vehicle and/or relative to the ground.

In an example embodiment, the first visual marker portion 350 is a portion of the viewable image 300 corresponding to an image of a physical target device 360 disposed on the boom and/or on the tool carrier and imaged by the camera device 121 wherein the physical boom target device 360 has one or more physical properties that lend themselves for determination by the virtual guidance apparatus 100 based on the obtained image of a pose, inclination, orientation, or the like of the physical target device 360 relative to the camera device 121 and, hence, also of the pose, inclination, orientation, or the like of the boom and/or of the tool carrier relative to the work vehicle and/or relative to the ground beneath the vehicle owing to a mounting of the physical boom target device 360 on the boom at a predetermined relative position between the target device and the boom. Physical target devices having such one or more physical properties that lend themselves for determination by the virtual guidance apparatus 100 based on the obtained image of a pose, inclination, orientation, or the like of the physical target device may include for example signage carrying positional indicia at predefined locations on the signage wherein examples include bar codes, Quick Response (QR) codes having position patterns at the corners of the QR code label, markers, or the like. Manufacturer's logos, or the like may also be provided on or at the boom and/or on or at the tool carrier on the end of the boom for imaging by the camera device 121 to determine from the obtained image a pose, inclination, orientation, or the like of the boom and/or of the tool carrier relative to the work vehicle and/or relative to the ground beneath the vehicle owing to a mounting of the physical boom target device in the example form of a manufacturer's logo or the like on the boom at a predetermined relative position between the target device and the boom and/or on the tool carrier at a predetermined relative position between the target device and the tool carrier.

In an example embodiment, the camera together with the logic executed by the processor of the guidance control unit of the apparatus may operate as a RTP system utilized to automatically return the loader, boom arm, and implements such as a bucket to a pre-stored position in response to operator input. The camera together with the logic executed by the processor effectively provides for directly or indirectly monitoring the position of the bucket relative to the body of the tractor in lieu of the need for physical implement position sensors such as linear transducers or the like to monitor the stroke position of cylinders. The camera provides the boom stroke position and other data related to the inclination of the implement on the boom in an essentially continual manner. In this regard, the motion of the cylinders 37, 39, 47, and 49 may be controlled by the virtual guidance apparatus 100 automatically and/or semi-automatically in response to generalized operator commands such as for example return to position (RTP) commands wherein for example the virtual guidance apparatus 100 may function in an RTP mode to automatically return the boom 20 overall, portions of the boom 20 such as for example the lift arms 36, 38 and/or the implement arms 46, 48, the various attachments, tools or implements 24 carried on the tool carrier 22, to one or more pre-stored position(s) in response to operator input. In accordance with an embodiment, the system 100 digitally determines an alignment in the form of a digital coincidence between the first visual marker portion 350 and the first virtual alignment target image 310 indicating that the loader 10 has been manipulated by the operator of the vehicle to its desired location relative to the vehicle and/or relative to the ground.

In the example, both the first virtual alignment target image 310 as well as the physical boom target device 360 on the loader represented as the first visual marker portion 350 may comprise similar cross-hair-type guiding lines so that a coincidence or near identical overlaying may be obtained. However, in further example embodiments, an alignment without exact coincidence between the first visual marker portion 350 of the viewable image 300 and the first virtual alignment target image 310 may be sufficient for establishing that the loader is in the desired position.

For ease of use for the operator and in accordance with a further example embodiment, the display unit 130 also simultaneously displays an enlarged image 300' of the viewable image 300 of the loader 10 described above on the screen 132 of the display unit that is viewable from an operator's seat of the associated work vehicle. The enlarged image 300' corresponds to a portion of the field of view of the camera device 121 directed to the first virtual alignment target image 310. For ease of reference by the operator, the enlarged image 300' and the regular viewable image 300 of the loader 10 are displayed in a screen-within-a-screen fashion. The display unit 130 also displays an enlarged first virtual alignment target image 310' (FIG. 4) superimposed on the image of the loader obtained by the camera when the loader is in the desired position. The enlarged first virtual alignment target image 310' is representative of a first predetermined target location 320' on the screen for alignment of a first visual marker portion 350' of the image of the loader.

Movement of the loader 10 relative to the associated work vehicle 1 from the position shown in FIG. 3 to the position shown in FIG. 4 to establish an alignment and preferably a coincidence between the first visual marker portion 350 of the viewable image 300 of the loader 10 displayed on the screen with the first virtual alignment target image 310 displayed at the first selectable target location 320 on the screen 132 corresponds to a first desired relative physical position between the loader 10 and the associated work vehicle 1. Equivalently, movement of the loader 10 relative to the associated work vehicle 1 from the position shown in FIG. 3 to the position shown in in FIG. 4 to establish a coincidence between the first visual marker portion 350 of the viewable image 300 of the loader 10 displayed on the screen with the first virtual alignment target image 310 displayed at the first selectable target location 320 on the screen 132 corresponds to a first desired relative physical position between the loader 10 and the ground supporting the associated work vehicle 1.

In the example embodiment the display unit is operable to dynamically display the image of the loader of the associated work vehicle obtained by the camera device on the screen of the display unit that is viewable from an operator's seat of the associated work vehicle. Further in the example embodiment the display unit is operable to statically display the first virtual alignment target superimposed on the image of the loader dynamically displayed on the screen. In particular, in the example embodiment, the display unit 130 is operable to receive the loader image data as the loader 10 is moved, and to dynamically display the viewable image 300 of the loader 10 of the associated work vehicle 1 on the screen 132 of the display unit 130, and the display unit 130 is further operable to statically display the first virtual alignment target image 310 superimposed on the viewable image 300 of the loader 10 dynamically displayed on the screen 132.

In an example embodiment, the first virtual alignment target image 310 displayed by the display unit 130 is representative of a first plurality of selectable target locations 320, 320' on the screen 132 for alignment of a corresponding plurality of articulated boom portions 350, 350' of the viewable image 300, 500, 700, 800 of the loader 10, wherein movement of multiple joints of the loader 10 relative to the associated work vehicle 1 to sequentially establish a coincidence between the plurality of articulated boom portions 350, 350' of the viewable image 300 of the loader 10 displayed on the screen 132 with the first plurality of selectable target locations 320, 320' on the screen 132 corresponds to a first desired relative physical position between one or more of a tool carrier 22 on an end of a boom 20 of the loader 10 and the associated work vehicle 1, and/or the tool carrier 22 on the end of the boom 20 of the loader 10 and the ground supporting the associated work vehicle 1.

In an example embodiment, the first virtual alignment target image 310 displayed by the display unit 130 is representative of a selectable boom target location 320' on the screen 132 for alignment of a boom portion 350' of the viewable image 300, 500, 700, 800 of the loader, wherein movement of the loader 10 relative to the associated work vehicle 1 to establish a coincidence between the boom portion 350' of the viewable image 300, 500, 700, 800 of the loader displayed on the screen 132 with the selectable boom target location 320' on the screen 132 corresponds to a first desired relative physical position between one or more of a boom 20 of the loader 10 and the associated work vehicle 1, and/or the boom 20 of the loader 10 and the ground supporting the associated work vehicle 1.

In an example embodiment, the physical boom target device 360 has one or more physical properties that lend themselves for determination by the virtual guidance apparatus 100 based on the obtained image of a pose, inclination, orientation, or the like of the physical boom target device 360 relative to the camera device 121 and, hence, also of the pose, inclination, orientation, or the like of the boom and/or of the tool carrier relative to the work vehicle and/or relative to the ground beneath the vehicle owing to a mounting of the physical boom target device 360 on the boom at a predetermined relative position between the target device and the boom. Physical target devices having such one or more physical properties that lend themselves for determination by the virtual guidance apparatus 100 based on the obtained image of a pose, inclination, orientation, or the like of the physical target device may include for example signage carrying positional indicia at predefined locations on the signage wherein examples include bar codes, QR codes having position patterns at the corners of the QR code label, markers, or the like. Manufacturer's logos, or the like may also be provided on or at the boom and/or on or at the tool carrier on the end of the boom for imaging by the camera device 121 to determine from the obtained image a pose, inclination, orientation, or the like of the boom and/or of the tool carrier relative to the work vehicle and/or relative to the ground beneath the vehicle owing to a mounting of the physical boom target device in the example form of a manufacturer's logo or the like on the boom at a predetermined relative position between the target device and the boom and/or on the tool carrier at a predetermined relative position between the target device and the tool carrier.

Further in the example embodiment the virtual guidance apparatus includes a physical boom target device 360 attached with a torsion support tube the boom 10 of the loader 10 of the associated work vehicle 1.

The example embodiment of the virtual guidance apparatus further includes an input 134, 214, 216 (FIG. 2) operatively coupled with the guidance control unit. The input may be used during a training of the virtual guidance apparatus for receiving a boom position training signal representative of the first predetermined target location on the screen for alignment of the boom target device in the image of the loader to establish the predetermined relative physical position between the boom portion of the loader and the ground supporting the associated work vehicle.

In an example embodiment the input 134, 214, 216 may include a touchscreen portion 134 of the display unit 130 or a pointer device 216 (FIG. 2) operatively coupled with the guidance control unit. The memory 210 of the guidance control unit 110 may store visual aid data 213 corresponding to the boom position training signal received by the input during the training. In particular and in accordance with an example embodiment, the input 134, 214, 216 comprises one or more of a touchscreen portion 134 of the display unit 130 and/or a pointer device 216 operatively coupled with the guidance control unit 110, and the memory 210 of the guidance control unit 110 stores the training data received from the operator via the input 134, 214, 216 as the visual aid data 213 corresponding to the target device training signal received by the input during the operator training of the system 100.

Further in the example embodiment, the output device 215 the system may generate a confirmation sound annunciating the coincidence of the first predetermined target location 320 with the first visual marker portion 350 of the image of the loader as shown for example in FIG. 4.

Figure 5A:
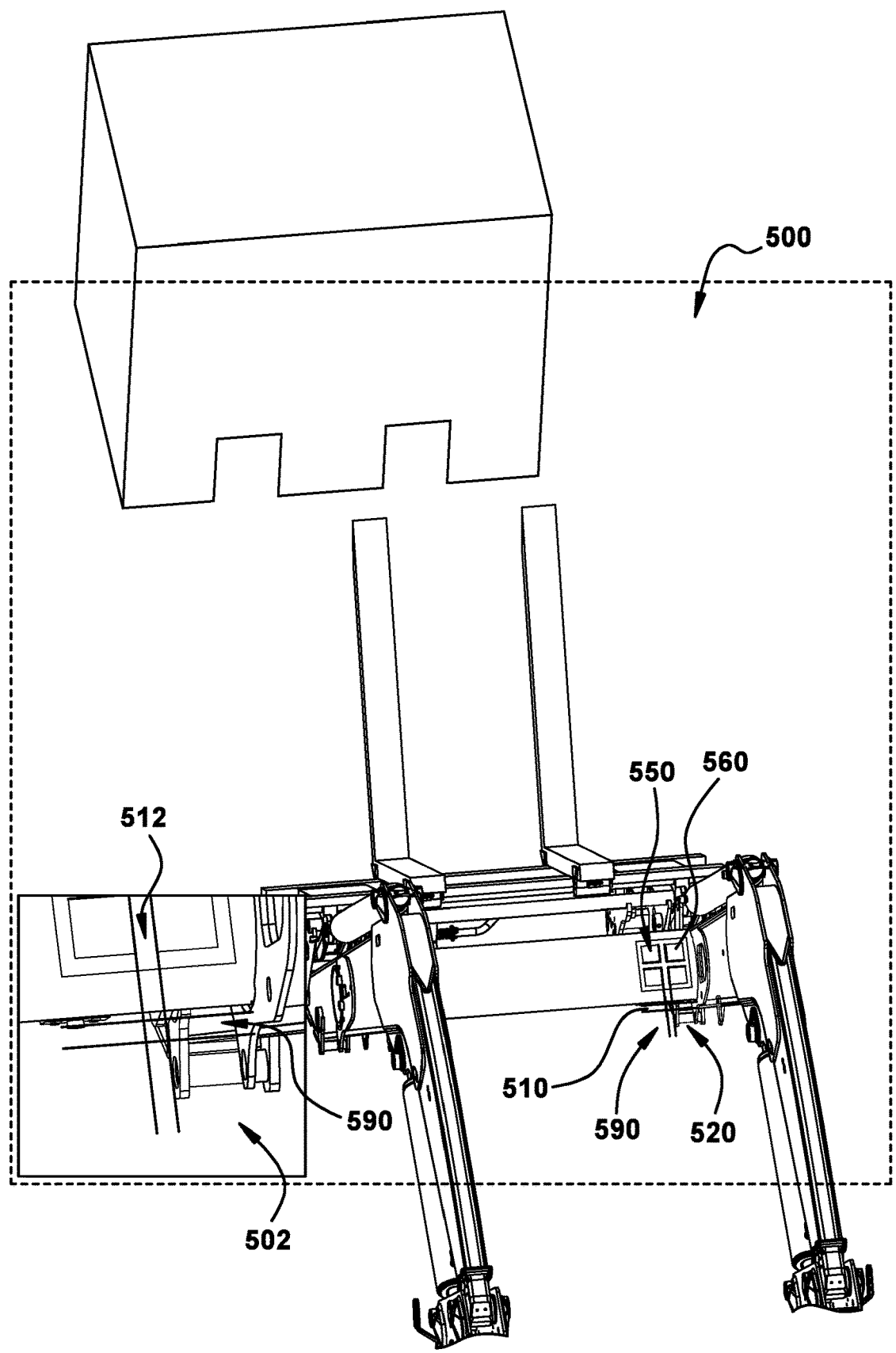
FIG. 5A shows an implement coupled with a tool carrier of a boom in a starting position illustrating a crosshairs visual aid useful to position the tool carrier together with the attached implement relative to the boom in accordance with an example embodiment.
Figure 5B:
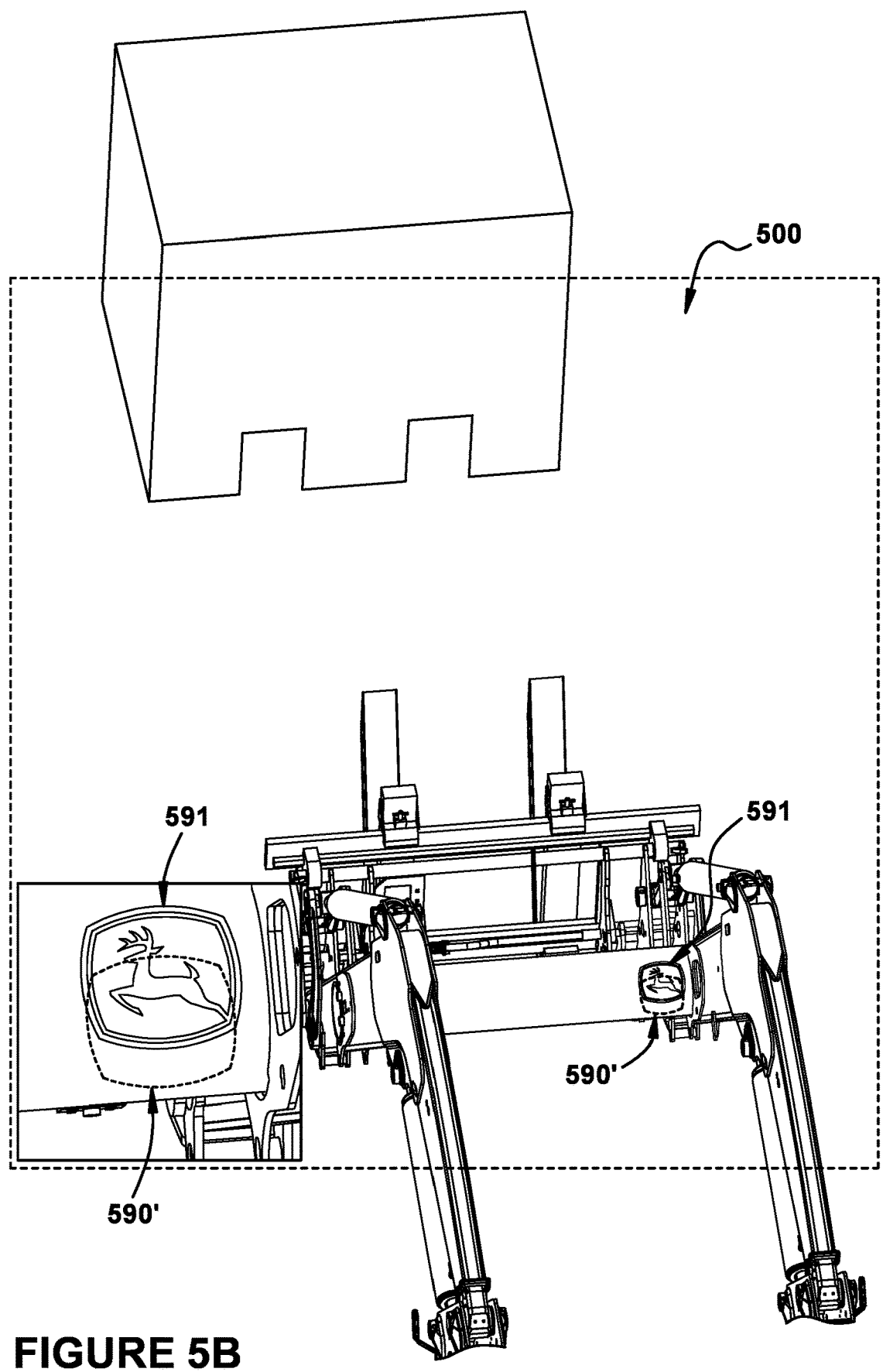
FIG. 5B shows the implement coupled with the tool carrier of the boom in the starting position of FIG. 5B and illustrating a visual symbol visual aid useful to position the tool carrier together with the attached implement relative to the boom in accordance with an example embodiment.
Figure 6A:
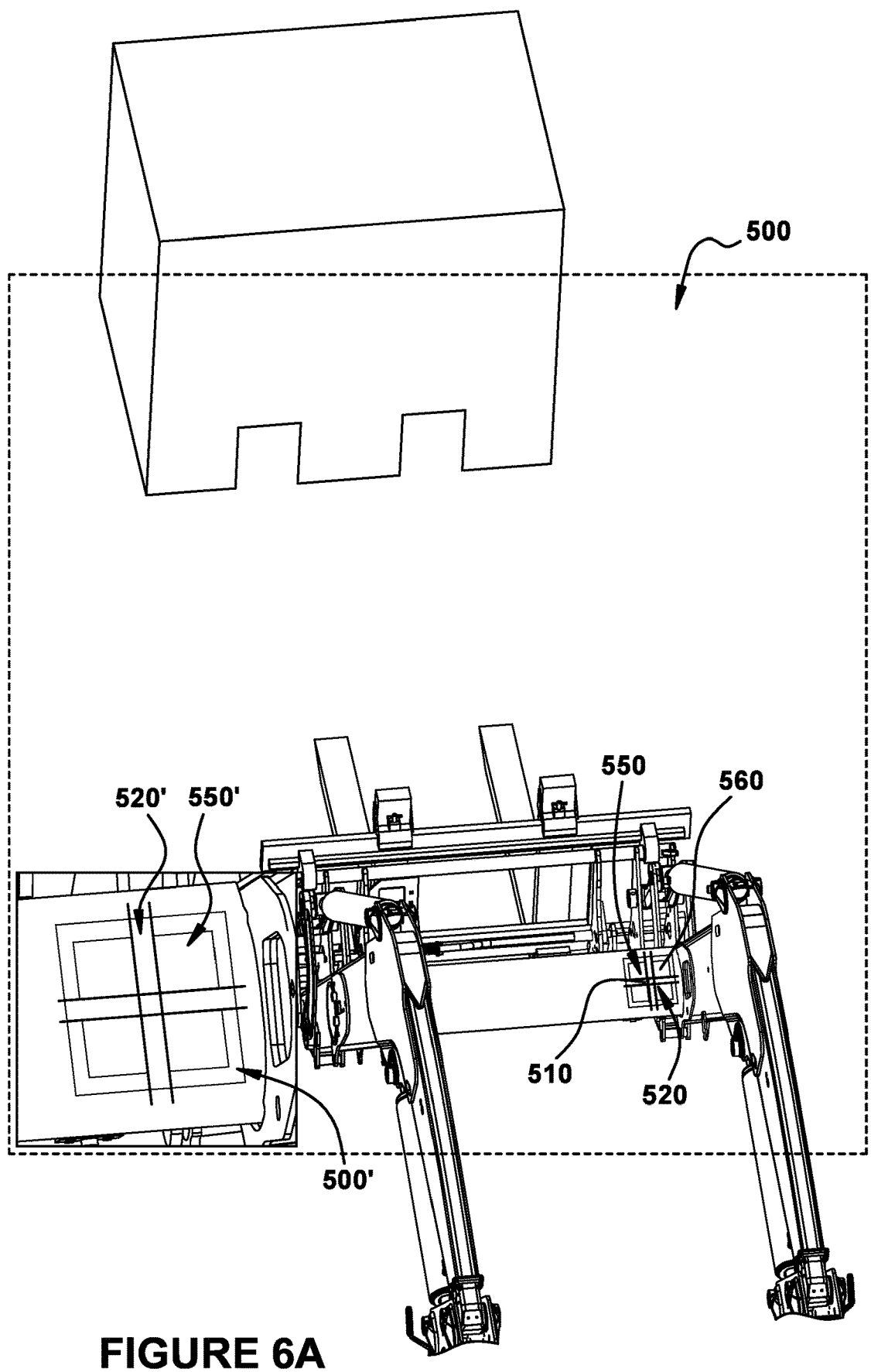
FIG. 6Aa shows the implement coupled with the tool carrier of the boom in a desired working position illustrating the crosshairs visual aid useful to position the tool carrier together with the attached implement relative to the ground and ready for engaging a load in accordance with an example embodiment.
Figure 6B:
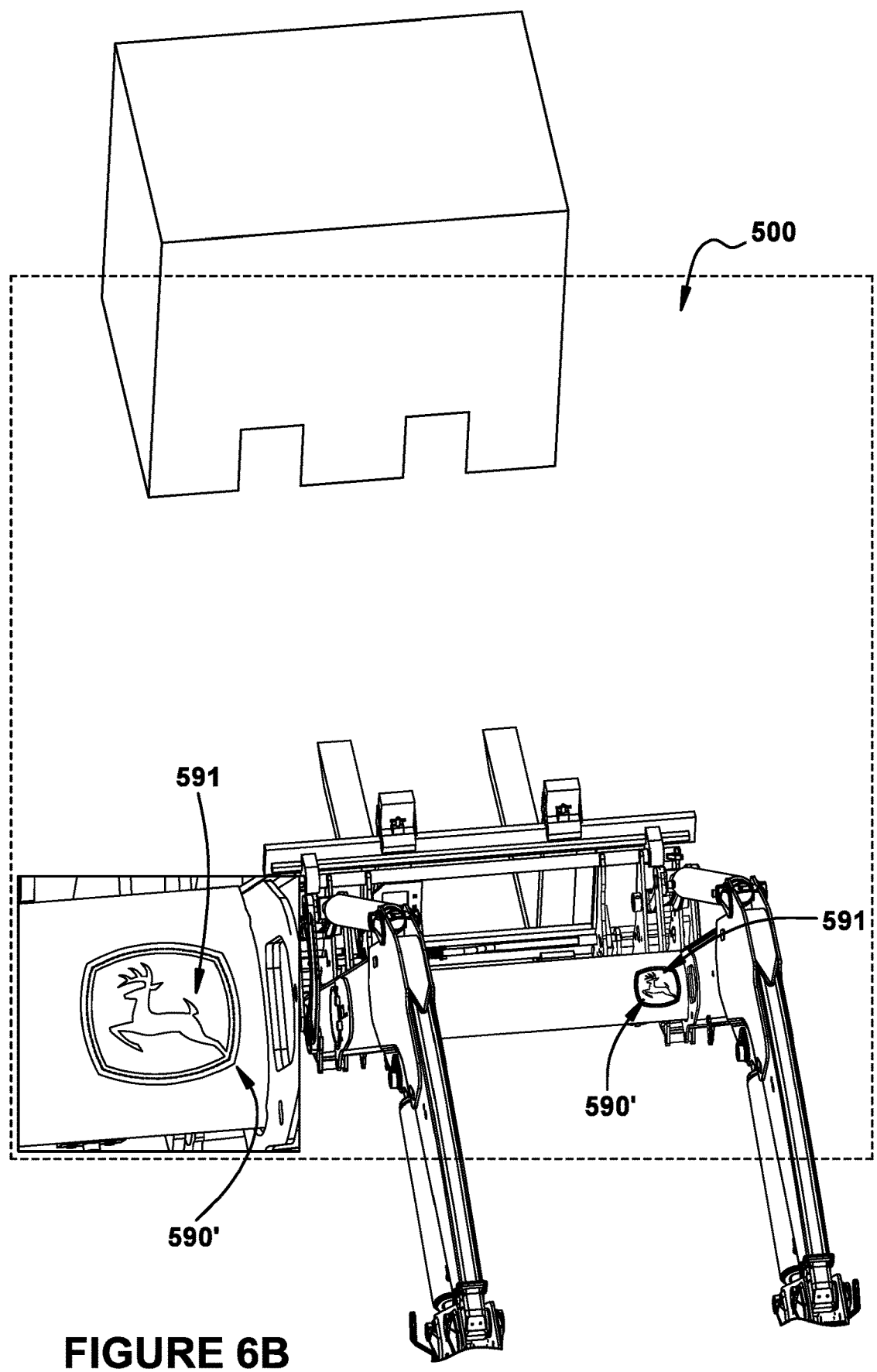
FIG. 6B shows the implement coupled with the tool carrier of the boom in the desired working position of FIG. 6A and illustrating the visual symbol visual aid useful to position the tool carrier together with the attached implement relative to the ground in accordance with an example embodiment.

Virtual Alignment Target Image Aids Useful to Position a Tool Carrier Relative to Boom FIGS. 5A, 5B, and 6A, 6B show visual aids and visual aid images useful to position a tool carrier on a free end of the boom relative to the boom in accordance with an example embodiment. The virtual alignment target image aids of the example embodiment of FIGS. 5A and 6B are cross-hair-type guiding lines 590, and the virtual alignment target image aids of the example embodiment of FIGS. 5B and 6B comprise a visual symbol such as the outline 590' of a manufacturer's logo 591 that is familiar to the vehicle operator and that provides reassuring comfort during operation of the vehicle. FIG. 5A shows an implement coupled with a tool carrier of a boom in a starting position illustrating a crosshairs visual aid useful to position the tool carrier together with the attached implement relative to the boom in accordance with an example embodiment. FIG. 5B shows the implement coupled with the tool carrier of the boom in the starting position of FIG. 5A and illustrating a visual symbol visual aid useful to position the tool carrier together with the attached implement relative to the boom in accordance with an example embodiment. FIG. 6A shows the implement coupled with the tool carrier of the boom in a desired working position illustrating the crosshairs visual aid useful to position the tool carrier together with the attached implement relative to the ground and ready for engaging a load in accordance with an example embodiment. FIG. 6B shows the implement coupled with the tool carrier of the boom in the desired working position of FIG. 6A and illustrating the visual symbol visual aid useful to position the tool carrier together with the attached implement relative to the ground in accordance with an example embodiment. It is to be appreciated however that other forms of guiding lines, shapes, or other forms or combination of forms such as for example, a silhouette of the boom of the loader arm in the one or more desired position(s), other comforting visual symbols, logos or the like may be used as necessary or desired.

With reference now to those Figures and as described above, a camera device 121 mounted on the associated work vehicle is operable to obtain an image of the loader 10 of the associated work vehicle 1, and the display unit 130 displays the viewable image 500 of the loader obtained by the camera device on the screen 132 of the display unit that is viewable from an operator's seat of the associated work vehicle. The display unit 130 also displays a second virtual alignment target image 510, 510' superimposed on the image of the loader obtained by the camera. The second virtual alignment target 510, 510' is representative of a second predetermined target location 520, 520' on the screen for alignment of a tool carrier portion of the image of the loader. In the example embodiment the camera device 121 is mounted on a top surface (e.g., roof) of the cab 5 of the tractor 2. In further example embodiments, the camera device 121 may be mounted on a hydraulic cylinder powering a mechanical self-leveling loader and, accordingly, movement of the various linkages of the loader mechanism changes the relative position of the camera device relative to the loader torsion support member as the orientation of the tines of the load mechanism relative to the ground is also changed. It is to be appreciated that although only a single camera device 121 is shown for ease of illustration mounted to the work vehicle 1 at the position shown, the camera device 121 shown is merely representative of a set of one or more cameras that may include several connected cameras that can be mounted on or near the vehicle or anywhere as may be necessary or desired such as for example on other areas of the work vehicle or on portions of the loader itself, on the vehicle, on the boom, on the carrier, and/or on the implement fir example in order to obtain as many images of one or more targets on the boom and/or on the tool carrier as may be necessary and/or desired for providing images of a full relevant range of movement or motion of the loader.

The display unit 130 also simultaneously displays an enlarged image 502 of the viewable image 500 described above of the loader obtained by the camera device on the screen 132 of the display unit that is viewable from an operator's seat of the associated work vehicle. The enlarged image 502 and the regular viewable image 500 of the loader are displayed in a screen-within-a-screen fashion. The display unit 130 also displays an enlarged second virtual alignment target image 512, 512' superimposed on the image obtained by the camera. The enlarged second virtual alignment target 512, 512' is representative of a first predetermined target location 522, 522' on the screen for alignment of a second portion 552, 552' of the image of the loader.

Movement of the tool carrier portion of the loader relative to the associated work vehicle from the position shown in FIG. 5 to the position shown in FIG. 6 to establish a coincidence between the tool carrier portion of the image of the loader displayed on the screen and the second predetermined target location 520 on the screen corresponds to a first predetermined relative physical position between the tool carrier portion of the loader and the ground supporting the associated work vehicle. In the example embodiment, the second virtual alignment target image 510, 510' superimposed on the viewable image 500 of the loader displayed on the screen 132 is representative of a second selectable target location 520, 520' on the screen 132 for alignment of a tool carrier portion 550 of the viewable image 500 of the loader, wherein movement of a carrier portion 22 of the loader relative 10 to the associated work vehicle to establish a coincidence between the tool carrier portion 550 of the viewable image 500 of the loader displayed on the screen 132 with the second virtual alignment target image 510, 510' displayed at the second selectable target location 520, 520' on the screen 132 corresponds to a desired relative physical position between one or more of the carrier portion 22 of the loader 10 and the associated work vehicle 1, and/or the carrier portion 22 of the loader 10 and the ground supporting the associated work vehicle 1.

The second virtual alignment target 510 displayed by the display unit is representative of a second predetermined target location 520 on the screen for indirect alignment of tines of the tool carrier portion of the image of the loader.

Movement of the various mechanisms of the loader but without moving the loader relative to the associated work vehicle to establish a coincidence between the tines of the tool carrier portion of the image of the loader displayed on the screen and the second predetermined target location 520 on the screen corresponds to a first predetermined relative physical position between the tines of the tool carrier portion of the loader and the ground supporting the associated work vehicle.

In an example embodiment, the second virtual alignment target 510 displayed by the display unit is representative of a second predetermined target location 520 on the screen for indirect alignment of a bucket in the tool carrier portion of the image of the loader, wherein movement of the loader relative to the associated work vehicle to establish a coincidence between the bucket in the tool carrier portion of the image of the loader displayed on the screen and the second predetermined target location on the screen corresponds to a first predetermined relative physical position between the bucket in the tool carrier portion of the loader and the ground supporting the associated work vehicle. In particular and in accordance with an example embodiment, the second virtual alignment target image 510 displayed by the display unit 130 is representative of a second selectable target location on the screen 132 for indirect alignment of a bucket in the tool carrier portion of the viewable image 300, 500, 700, 800 of the loader, wherein movement of the loader relative to the associated work vehicle to establish a coincidence between the bucket 25 in the tool carrier portion of the viewable image of the loader displayed on the screen with the second selectable target location on the screen 132 corresponds to a desired relative physical position between one or more of the bucket 25 attached with the tool carrier 22 of the loader 10 and the associated work vehicle 1, and/or the bucket 25 on the tool carrier 22 of the loader 10 and the ground supporting the associated work vehicle 1.

In addition in accordance with the example embodiment, the virtual guidance apparatus includes an input 214 operatively coupled with the guidance control unit. The input may be used during a training of the virtual guidance apparatus for receiving a tool carrier position training signal representative of the second predetermined target location on the screen for alignment of the tool carrier target device in the image of the loader to establish the predetermined relative physical position between the tool carrier portion of the loader and the ground supporting the associated work vehicle.

In an example embodiment the input 214 may include a touchscreen portion of the display unit 130 or a pointer device 216 (FIG. 2) operatively coupled with the guidance control unit. The memory 210 of the guidance control unit 110 may store data corresponding to the tool carrier position training signal received by the input during the training. In particular and in accordance with an example embodiment, the input 134, 214, 216 comprises one or more of a touchscreen portion 134 of the display unit 130 and/or a pointer device 216 operatively coupled with the guidance control unit 110, and the memory 210 of the guidance control unit 110 stores training data corresponding to the tool carrier training position signal received by the input 134, 214, 216 during the training.

Further in the example embodiment, the output device 215 the system may generate a confirmation sound annunciating the coincidence of the second predetermined target location 520 with the second portion 550 of the image of the loader as shown for example in FIG. 4.

In accordance with an embodiment and during RTP operation, the system 100 digitally determines an alignment in the form of a digital coincidence between the tool carrier portion 550 of the viewable image 500 of the loader displayed on the screen 132 with the second virtual alignment target image 510, 510' displayed at the second selectable target location 520, 520' on the screen 132 which corresponds to the desired relative physical position between one or more of the carrier portion 22 of the loader 10 and the associated work vehicle 1, and/or the carrier portion 22 of the loader 10 and the ground supporting the associated work vehicle 1.

Visual Aid Images Showing Preview Paths

As mentioned above, visual aids are provided to the operator to assist in positioning the loader of the work vehicle relative to a tool or implement, to assist in positioning the tool carried on the loader with respect to a load, to assist in moving a load carried by the tool or implement relative to a desired placement location, and/or to assist in moving the load from a load placement location by using the tool or implement carried on the loader. In some example embodiments, one or more preview paths are presented to the operator having one or more guidelines displayed over the one or more preview paths and/or overlying the one or more preview paths for movement of the loader relative to the tool, for movement of the vehicle carrying the tool relative to a load, for movement of the vehicle carrying the load relative to a desired unloading location, and/or for movement of the vehicle when removing the load from a load placement location such as from a rack or the like.

In an example embodiment during system training of preview paths, the operator may first position the tool carrier on the boom 20 to a desired position relative to the tool or implement intended to be attached to the tool carrier, or position the tool relative to the load to be processed, or position the load relative to the unload location, then drag and drop virtual indicia movable on the touchscreen 134 using a pointer or finger onto a selected portion of the image of boom on the screen 132 while the selected equipment is in the desired position, wherein the virtual indicia comprises training signals representative of selectable target location on the screen for presentation of one or more guidelines to be displayed on the screen during tool and load handling.

In a further example embodiment and as will be described in greater detail below, the visual aid images showing the preview paths as a pair of preview path guidelines may be generated by the processor 204 executing the logic 211 to generate the preview path guidelines extending from one or more virtual planes at the face of the tool carrier, at the interface between the tool carrier and the tool, at the face of the load, and/or at the face of the unloading location.

In an embodiment, the visual aid images showing the one or more preview paths are provided in the form of guidelines extending between a physical feature of the tool carrier such as a physical marker on the tool carrier and a physical feature of the tool or implement intended to be attached to the tool carrier such as a physical marker on the tool. In a further embodiment, the preview of the path is representative of a direct virtual path of the tool carrier. In an embodiment the preview path is provided in the form of guidelines extending between a coupling feature of the tool carrier and a coupling feature of the tool or implement intended to be attached to the tool carrier. In a still further embodiment, the preview of the path is representative of an indirect virtual path of the tool carrier that is not directly physically visible to the operator, wherein the operator may operate the work vehicle based on the displayed virtual path preview for correctly moving the work vehicle relative to the tool or implement intended to be attached to the tool carrier. In an embodiment the preview path is provided in the form of guidelines extending between a geometrical feature of the tool carrier and a physical feature of the tool or implement intended to be attached to the tool carrier such as a physical marker on the tool or implement intended to be attached to the tool carrier. In a further embodiment the preview path is provided in the form of guidelines extending between a virtual feature of the tool carrier and a geometrical feature of the tool or implement intended to be attached to the tool carrier such as a physical feature of the tool or implement intended to be attached to the tool carrier offset from a physical coupling feature of the tool or implement intended to be attached to the tool carrier.

In an embodiment, the visual aid images showing the one or more preview paths are provided in the form of guidelines extending between a physical feature of the implement or tool such as a physical marker on the implement or tool and a physical feature of the target or load such as a physical marker on the target or load. In a further embodiment, the preview of the path is representative of a direct virtual path of the tool carrier or of an implement attached with the tool carrier. In an embodiment the preview path is provided in the form of guidelines extending between a coupling feature of the implement or tool and a coupling feature of the target or load. In a still further embodiment, the preview of the path is representative of an indirect virtual path of an implement attached with the tool carrier that is not directly physically visible to the operator, wherein the operator may operate the work vehicle based on the displayed virtual path preview for correctly moving the work vehicle relative to the load. In an embodiment the preview path is provided in the form of guidelines extending between a geometrical feature of the implement or tool and a physical feature of the target or load such as a physical marker on the target or load. In a further embodiment the preview path is provided in the form of guidelines extending between a virtual feature of the implement or tool and a geometrical feature of the target or load such as a physical feature of the target or load offset from a physical coupling feature of the target or load.

After the load is engaged and raised using the loader 10 with the implement 24 coupled therewith, further visual aids described herein are developed by the system and provided to the operator of the associated work vehicle 1 for assisting in properly placing the load at a desired location such as on associated storage rack, platform or the like. In an embodiment a preview path is provided in the form of guidelines extending between a physical feature of the load as a physical marker on the load and a physical feature of the target location such as a physical marker on the target location. In a further embodiment, the preview of the path is representative of a direct virtual path of the load attached carried by the tool. In an embodiment the preview path is provided in the form of guidelines extending between a coupling feature of the load and a coupling feature of the target location. In a still further embodiment, the preview of the path is representative of an indirect virtual path of the carried load that is not directly physically visible to the operator, wherein the operator may operate the work vehicle based on the displayed virtual path preview for correctly moving the work vehicle carrying the load relative to the desired unloading location. In an embodiment the preview path is provided in the form of guidelines extending between a geometrical feature of the load and a physical feature of the target location such as a physical marker on the target location. In a further embodiment the preview path is provided in the form of guidelines extending between a virtual feature of the load and a geometrical feature of the target location such as a physical feature of the target location offset from a physical coupling feature of the target location.

In an embodiment, the visual aid images showing the one or more preview paths are provided in the form of guidelines extending between a physical feature of the load or of the tool such as a physical marker on the load or tool and a physical feature of a load placement location such as a physical marker disposed on a rack, shelf or the like configured to receive the load therein or thereon. In a further embodiment, the preview of the path is representative of a direct virtual path of the tool or of the load carried by the tool. In an embodiment the preview path is provided in the form of guidelines extending between a coupling feature of the tool or load and a coupling feature of the load placement location. In a still further embodiment, the preview of the path is representative of an indirect virtual path of a load attached or otherwise carried by the tool that is not directly physically visible to the operator, wherein the operator may operate the work vehicle based on the displayed virtual path preview for correctly moving the workpiece load carried by the load relative to the load placement location. In an embodiment the preview path is provided in the form of guidelines extending between a geometrical feature of the load or tool and a physical feature of the load placement location such as a physical marker disposed on a rack, shelf or the like configured to receive the load therein or thereon. In a further embodiment the preview path is provided in the form of guidelines extending between a virtual feature of the load or tool and a geometrical feature of the load placement location such as a physical feature of the placement location offset from a physical structure or area of the placement location. In an embodiment, the visual aid images showing the one or more preview paths are provided in the form of guidelines extending between a physical feature of the load or tool such as a physical marker on the implement or tool and a physical feature of the load placement location such as a physical marker on the target load placement location. In a further embodiment, the preview of the path is representative of a direct virtual path of the tool or of a load carried by the tool. In an embodiment the preview path is provided in the form of guidelines extending between a coupling feature of the load or tool and a coupling feature of the load placement location. In a still further embodiment, the preview of the path is representative of an indirect virtual path of a load carried by the tool that is not directly physically visible to the operator, wherein the operator may operate the work vehicle based on the displayed virtual path preview for correctly moving the load relative to the load placement location. In an embodiment the preview path is provided in the form of guidelines extending between a geometrical feature of the load or tool and a physical feature of the target load placement location such as a physical marker disposed on a rack, shelf or the like configured to receive the load therein or thereon. In a further embodiment the preview path is provided in the form of guidelines extending between a virtual feature of the load tool and a geometrical feature of the target load placement location such as a physical feature of the target load placement location offset from a physical coupling feature of the load placement location.

Figure 7A:
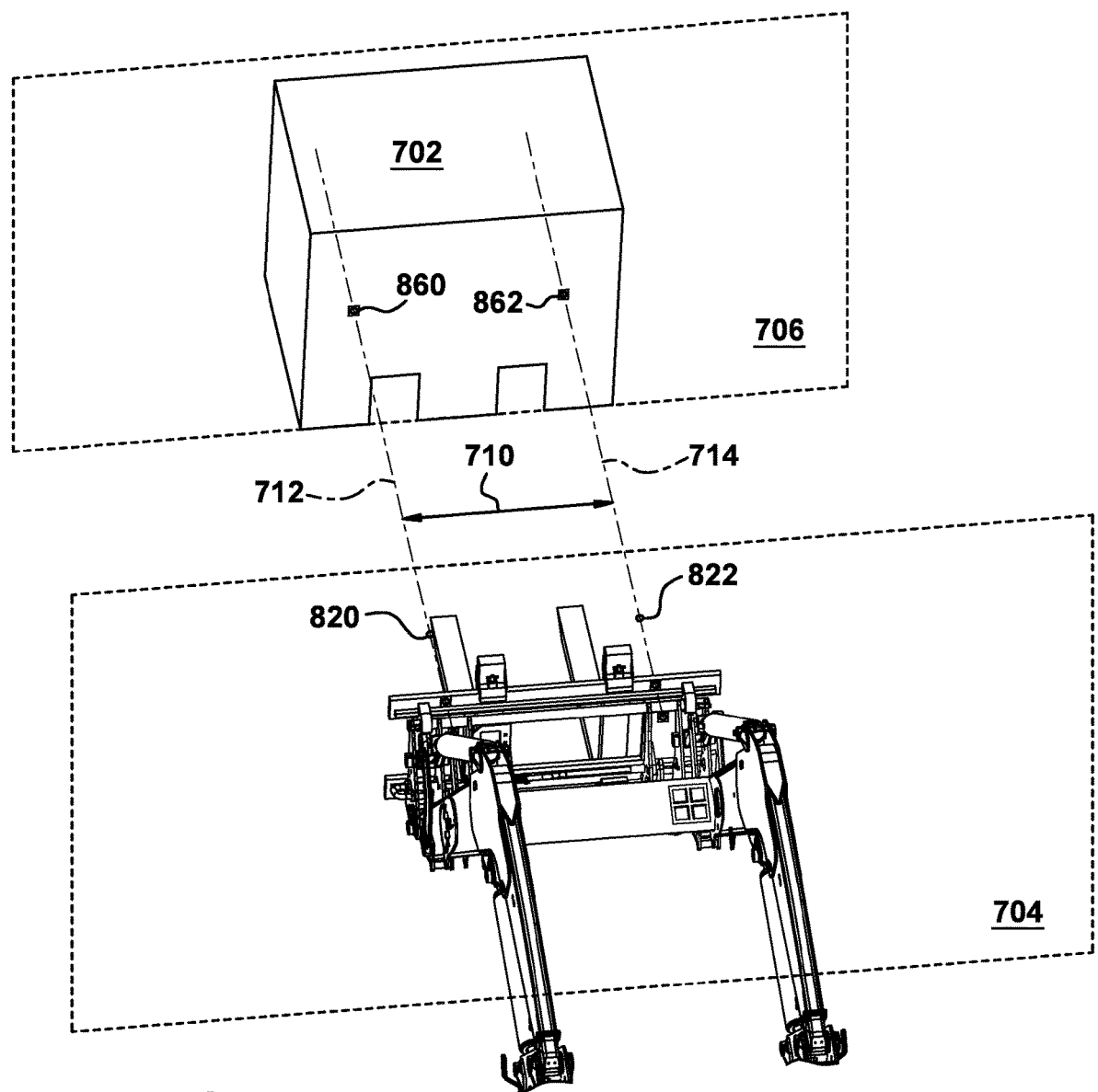
FIG. 7A shows preview path visual aids useful to illustrate a virtual preview path of an implement attached with the tool carrier on the end of the boom in accordance with an example embodiment.

FIG. 7A shows example preview path visual aids that are useful to illustrate a virtual preview path of an implement attached with the tool carrier on the end of the boom in accordance with an example embodiment and by way of example of the preview path visual aids described above. In this embodiment, the preview path is provided in the form of guidelines extending between a physical feature of the implement or tool such as a physical marker on the implement or tool and a physical feature of the target or load such as a physical marker on the target or load. With reference now to that Figure and as described above, the camera device 121 mounted on the associated work vehicle is operable to obtain an image of the loader 10 of the associated work vehicle 1. The display unit 130 displays the viewable image 700 of the loader obtained by the camera device on the screen 132 of the display unit that is viewable from an operator's seat of the associated work vehicle. The display unit 130 also displays on the screen 132 a third virtual alignment target image 710 superimposed on the viewable image 700 of the loader 10. The third virtual alignment target image 710 is representative of a preview path 712, 714 on the screen 132 of movement to be followed by a tool carrier portion 22 of the loader 10 for forward movement of the associated work vehicle 1.

The third virtual alignment target image 710 representative of the preview path 712, 714 displayed on the screen 132 essentially provides a virtual directional heading image 710 superimposed on the viewable image of the loader based on the image obtained by the camera, wherein the virtual directional heading image is representative of a preview path on the screen of a movement path to be followed by a tool carrier of the loader for forward movement of the associated work vehicle.

In addition in accordance with the example embodiment, the third virtual alignment target is representative of a pair of spaced apart preview path guidelines 712, 714 of movement on the screen to be followed by tines of an implement attached with the tool carrier portion of the image of the loader for forward movement of the associated work vehicle. In particular and in accordance with an embodiment, the third virtual alignment target image 710 superimposed on the viewable image 700 of the loader is representative of a pair of spaced apart preview path guidelines 712, 714 of movement on the screen 132 to be followed by one or more of tines 28 of the tool carrier portion 22 of the image of the loader for forward movement of the associated work vehicle 1, and/or a surface of the tool carrier 22 acting as a pilot for forward movement of the associated work vehicle 1.

In the example embodiment shown, the preview of the path is representative of an actual path of one or more implements attached with the tool carrier 22 on the boom. However, it is to be appreciated that in a further embodiment, the preview of the path is representative of a direct virtual path of one or more implements, tools or other attachments such as for example a bucket on the boom. In a still further embodiment, the preview of the path is representative of an indirect virtual path of an implement attached with the tool carrier 22 that is not directly physically visible to the operator such as for example a gripper, a grapple, or a bail hugger, wherein the operator may operate the work vehicle based on the virtual path preview for correctly moving the work vehicle towards the load.

Further in accordance with the example embodiment shown, the display unit 130 also displays a fourth virtual alignment target set 800 (see also FIG. 8) superimposed on the image of the workpiece and the implement attached with the tool carrier. The fourth virtual alignment target set may include destination target indicia 860, 862 physically disposed on the workpiece as shown or superimposed on the image of the workpiece (not shown), and presence target indicia 820, 822 superimposed on the image of the implement attached with the tool carrier. The destination target indicia 860, 862 and the presence target indicia 820, 822 are representative of a preview path of movement on the screen to be followed by the associated work vehicle moving forward to effectively couple, prior to lifting the associated workpiece with the loader, the associated workpiece with the implement attached with the tool carrier portion for the presence target indicia 820, 822 being coincident with the destination target indicia 860, 862. It is to be appreciated that during use in the example embodiment the destination target indicia 860, 862 remain fixed in place relative to the view of the load 702 displayed on the screen 132 of the display unit 130 and viewable by the operator of the tractor 2, and the image of the presence target indicia 820, 822 remain fixed in place relative to the loader and also relative to the guidelines 712, 714. In this way the operator is provided with visual feedback of confirmation that the tool is in a desired position for lifting the load when the presence target indicia 820, 822 and the destination target indicia 860, 862 are made to mutually overly on the screen 132 of the display unit 130 by the operator moving the vehicle.

The destination target indicia 860, 862 physically disposed on the workpiece may have one or more physical properties that lend themselves for determination by the virtual guidance apparatus 100 based on an obtained image of a pose, inclination, orientation, or the like of the physical target indicia 860, 862 relative to the camera device 121 and, hence, also of the pose, inclination, orientation, or the like of a virtual load connecting plane 706 disposed at the face of the load 702. The virtual load connecting plane 706 is perpendicular with the ground. Physical target devices having such one or more physical properties that lend themselves for determination by the virtual guidance apparatus 100 based on the obtained image of a pose, inclination, orientation, or the like of the physical target device may include for example signage carrying positional indicia at predefined locations on the signage wherein examples include bar codes, QR codes having position patterns at the corners of the QR code label, markers, or the like. Manufacturer's logos, or the like may also be provided on or at the load and/or on or at a selected storage location such as a storage rack, platform or the like for imaging by the camera device 121 to determine from the obtained image a pose, inclination, orientation, or the like of the load and/or of the storage location relative to the work vehicle and/or relative to the tool carried by the vehicle owing to a mounting of the physical destination target indicia device(s) in the example form of a manufacturer's logo or the like on the load at a predetermined relative position on the load and/or on a storage location or storage apparatus such as a storage rack at one or more predetermined positions.

In addition in accordance with the example embodiment, the virtual guidance apparatus includes an input 214 operatively coupled with the guidance control unit. The input may be used during a training of the virtual guidance apparatus for receiving a path preview training signal representative of the preview path on the screen of movement to be followed by the tool carrier portion of the image of the loader for forward movement of the associated work vehicle.

In an example embodiment the input 214 may include a touchscreen portion of the display unit 130 or a pointer device 216 (FIG. 2) operatively coupled with the guidance control unit. The memory 210 of the guidance control unit 110 may store data corresponding to the path preview training signal received by the input during the training. In the example embodiments herein the virtual alignment target image(s) such as for example the virtual alignment target image 710 of FIG. 7A superimposed on the viewable image 700 of the loader 10 and other virtual alignment target images as will be described below virtual alignment target image may be inputted by the operator during a training of the virtual guidance apparatus for receiving a path preview training signal representative of the preview path on the screen of movement to be followed by the tool carrier portion of the image of the loader for forward movement of the associated work vehicle. It is to be appreciated that the operator may train the system on learning the virtual alignment target image(s) by the operator dragging and dropping the virtual alignment target image(s) onto the screen in alignment with the tool as desired by the operator, and by the operator dragging and dropping the presence target indicia 820, 822 and the destination target indicia 860, 862 onto the screen when the tool is in the desired operation relative to the load. Thereafter the preview path visual aids are automated by the system recalling the stored guidelines and indicia at suitable times during loader operation.

In accordance with an embodiment the preview path visual aids to be displayed on the screen may be digitally compared by logic executed by the processor of the guidance control unit with visual marker portions of the viewable image of the loader in order to determine that the loader has reached a desired conformation relative to the tool, that the tool has reached a desired conformation relative to the load, and/or that the load has reached a desired conformation relative to a load placement location such as s rack, shelf, or the like.

It is still further to be appreciated that the motion of the tractor 2 may be controlled by the virtual guidance apparatus 100 automatically and/or semi-automatically in response to generalized operator commands such as for example return to position (RTP) commands wherein for example the virtual guidance apparatus 100 may function in an RTP mode to automatically return the boom 20 overall, portions of the boom 20 such as for example the lift arms 36, 38 and/or the implement arms 46, 48, the various attachments, tools or implements 24 carried on the tool carrier 22, steering mechanisms of the vehicle, etc. to one or more pre-stored position(s) in response to operator input.

Figure 7B:
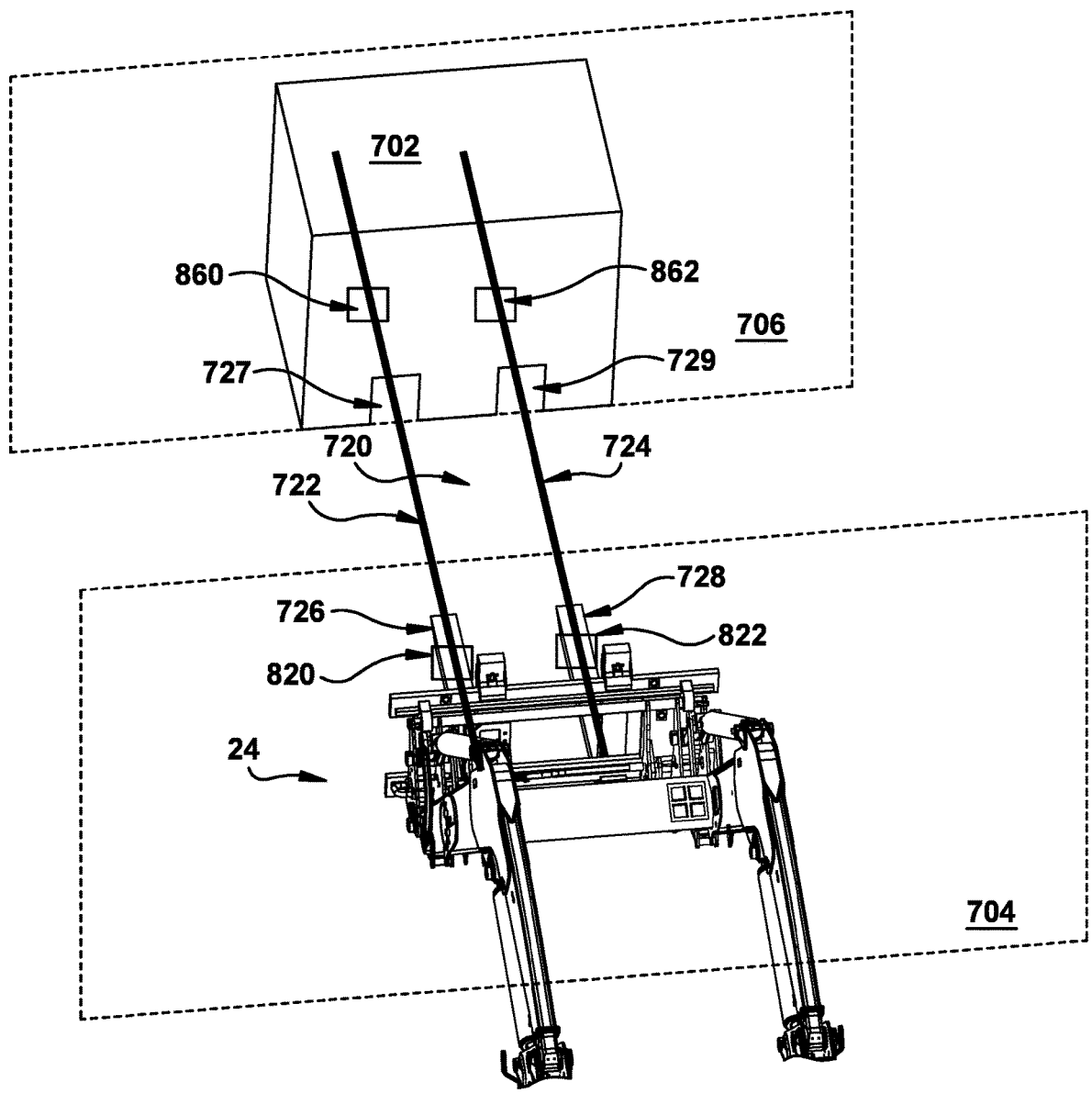
FIG. 7B shows preview path visual aids useful to illustrate a virtual preview path of an implement attached with the tool carrier on the end of the boom in accordance with an example embodiment.

FIG. 7B shows preview path visual aids 720 useful to illustrate a virtual preview path of an implement attached with the tool carrier on the end of the boom in accordance with an example embodiment, wherein in the embodiment the preview path visual aids 720 are provided in the form of guidelines 722, 724 extending between coupling features 726, 728 of the implement or tool 24 and coupling features 727, 729 of the target or load 702. In the example embodiment, the guidelines 722, 724 extend perpendicularly from a virtual tool connecting plane 704 disposed at the interface between the tool carrier and the tool. The virtual tool connecting plane 704 is perpendicular with the ground. In addition, the guidelines 722, 724 also extend perpendicularly from the virtual load connecting plane 706 disposed at the face of the load 702. The virtual load connecting plane 706 is perpendicular with the ground.

The third virtual alignment target image 720 representative of the preview path 722, 724 displayed on the screen 132 essentially provides a virtual directional heading image 720 superimposed on the viewable image of the loader based on the image obtained by the camera, wherein the virtual directional heading image is representative of a preview path on the screen of a movement path to be followed by a tool carrier of the loader for forward movement of the associated work vehicle.

Further in accordance with the example embodiment shown, the display unit 130 also displays an additional virtual alignment target set, such as the set 800 described above in connection with FIG. 7A, superimposed on the image of the workpiece and the implement attached with the tool carrier. The fourth virtual alignment target set of the example embodiment shown in FIG. 7B may include destination target indicia 870, 872 physically disposed on the workpiece as shown or superimposed on the image of the workpiece (not shown), and presence target indicia 830, 832 superimposed on the image of the implement attached with the tool carrier. The destination target indicia 870, 872 and the presence target indicia 830, 832 are representative of a preview path of movement on the screen to be followed by the associated work vehicle moving forward to effectively couple, prior to lifting the associated workpiece with the loader, the associated workpiece with the implement attached with the tool carrier portion for the presence target indicia 830, 832 being coincident with the destination target indicia 870, 872. The destination target indicia 870, 872 and the presence target indicia 830, 832 are disposed on the guidelines 722, 724 extending between coupling features 726, 728 of the implement or tool 24 and coupling features 727, 729 of the target or load 702.

Figure 7C:
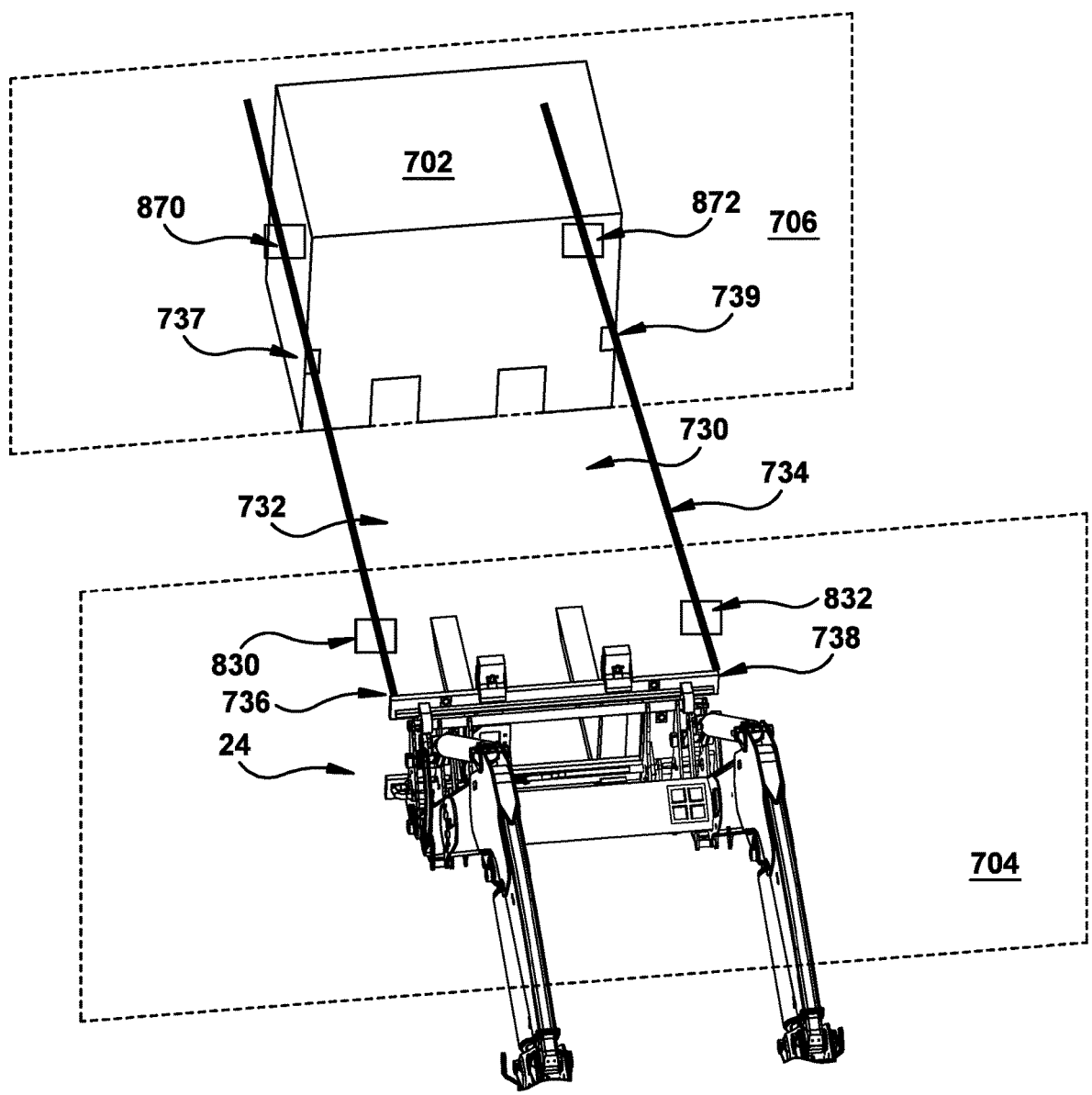
FIG. 7C shows preview path visual aids useful to illustrate a virtual preview path of an implement attached with the tool carrier on the end of the boom in accordance with an example embodiment.

FIG. 7C shows preview path visual aids 730 useful to illustrate a virtual preview path of an implement attached with the tool carrier on the end of the boom in accordance with an example embodiment, wherein in the example embodiment the preview path visual aids 730 are provided in the form of guidelines 732, 734 extending between geometrical features 736, 738 of the implement or tool 24 and physical features 737, 739 of the target or load 702. The physical features 737, 739 of the target or load 702 may be physical markers on the target or load for example. In the example embodiment, the guidelines 732, 734 extend perpendicularly from a virtual tool connecting plane 704 disposed at the interface between the tool carrier and the tool. The virtual tool connecting plane 704 is perpendicular with the ground. In addition, the guidelines 732, 734 also extend perpendicularly from a virtual load connecting plane 706 disposed at the face of the load 702. The virtual load connecting plane 706 is perpendicular with the ground.

The physical features 737, 739 of the target or load 702 may be physical markers on the target or load for example and may have one or more physical properties that lend themselves for determination by the virtual guidance apparatus 100 based on an obtained image of a pose, inclination, orientation, or the like of the physical target indicia 737, 739 relative to the camera device 121 and, hence, also of the pose, inclination, orientation, or the like of a virtual load connecting plane 706 disposed at the face of the load 702. The virtual load connecting plane 706 is perpendicular with the ground. Physical target devices having such one or more physical properties that lend themselves for determination by the virtual guidance apparatus 100 based on the obtained image of a pose, inclination, orientation, or the like of the physical target device may include for example signage carrying positional indicia at predefined locations on the signage wherein examples include bar codes, QR codes having position patterns at the corners of the QR code label, markers, or the like. Manufacturer's logos, or the like may also be provided on or at the load and/or on or at a selected storage location such as a storage rack, platform or the like for imaging by the camera device 121 to determine from the obtained image a pose, inclination, orientation, or the like of the load and/or of the storage location relative to the work vehicle and/or relative to the tool carried by the vehicle owing to a mounting of the physical destination target indicia device(s) in the example form of a manufacturer's logo or the like on the load at a predetermined relative position on the load and/or on a storage location or storage apparatus such as a storage rack at one or more predetermined positions.

The third virtual alignment target image 730 representative of the preview path 732, 734 displayed on the screen 132 essentially provides a virtual directional heading image 730 superimposed on the viewable image of the loader based on the image obtained by the camera, wherein the virtual directional heading image is representative of a preview path on the screen of a movement path to be followed by a tool carrier of the loader for forward movement of the associated work vehicle.

Further in accordance with the example embodiment shown, the display unit 130 also displays an additional virtual alignment target set, such as the set 800 described above in connection with FIG. 7A, superimposed on the image of the workpiece and the implement attached with the tool carrier. The fourth virtual alignment target set of the example embodiment shown in FIG. 7C may include destination target indicia 880, 882 physically disposed on the workpiece as shown or superimposed on the image of the workpiece (not shown), and presence target indicia 840, 842 superimposed on the image of the implement attached with the tool carrier. The destination target indicia 880, 882 and the presence target indicia 840, 842 are representative of a preview path of movement on the screen to be followed by the associated work vehicle moving forward to effectively couple, prior to lifting the associated workpiece with the loader, the associated workpiece with the implement attached with the tool carrier portion for the presence target indicia 840, 842 being coincident with the destination target indicia 880, 882. The destination target indicia 880, 882 and the presence target indicia 840, 842 are disposed on the guidelines 732, 734 extending between geometrical features 736, 738 of the implement or tool 24 and physical features 737, 739 of the target or load 702.

Figure 7D:
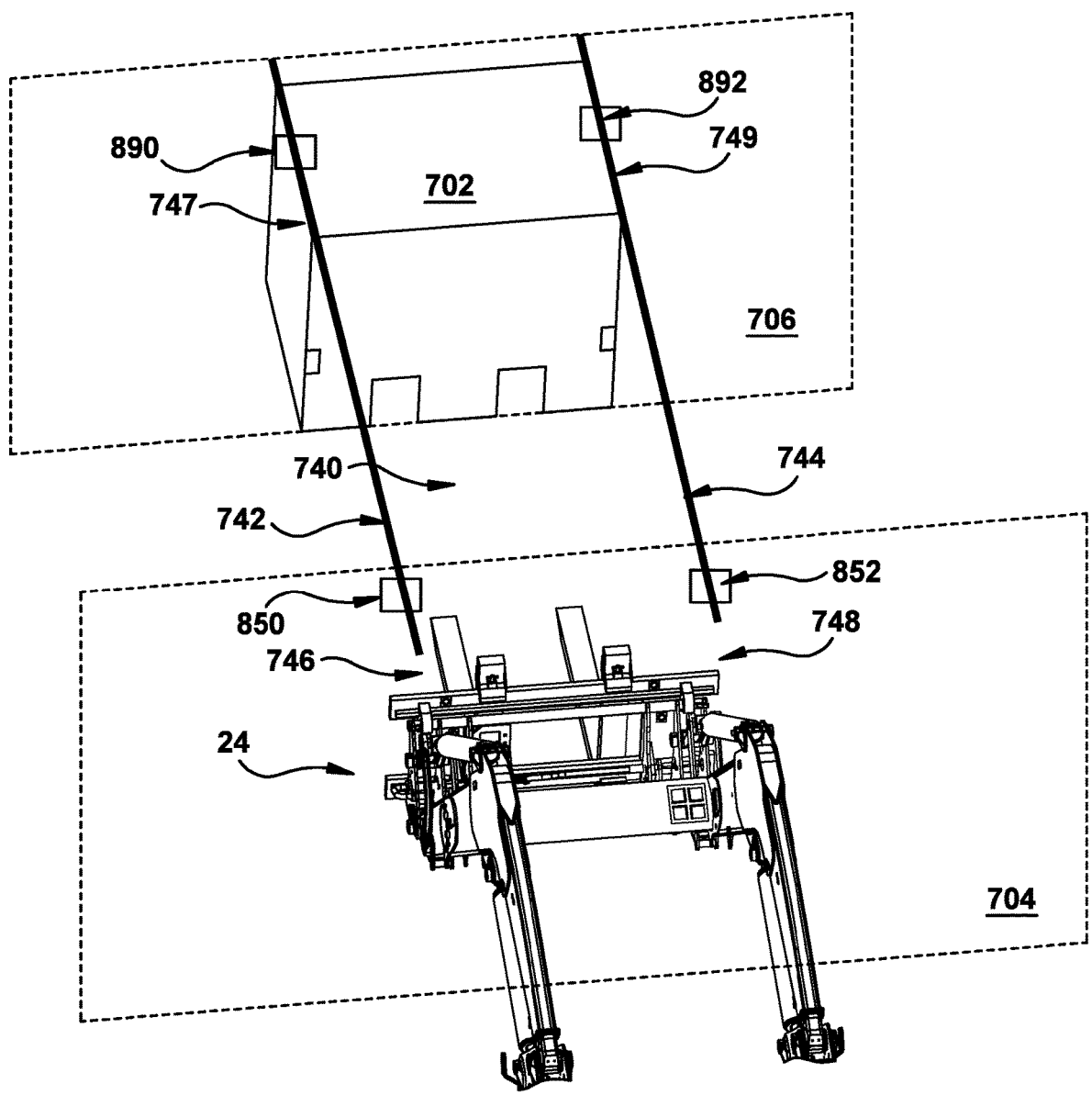
FIG. 7D shows preview path visual aids useful to illustrate a virtual preview path of an implement attached with the tool carrier on the end of the boom in accordance with an example embodiment.

FIG. 7D shows preview path visual aids 740 useful to illustrate a virtual preview path of an implement attached with the tool carrier on the end of the boom in accordance with an example embodiment, wherein in the example embodiment the preview path visual aids 740 are provided in the form of guidelines 742, 744 extending between virtual features 746, 748 of the implement or tool and geometrical features 747, 749 of the target or load 702 such as for example one or more physical features of the target or load such as the top opposite left and right edges of the load 702 offset from a physical coupling features 727, 729 (FIG. 7B) of the target or load 702. In the example embodiment, the guidelines 742, 744 extend perpendicularly from a virtual tool connecting plane 704 disposed at the interface between the tool carrier and the tool. The virtual tool connecting plane 704 is perpendicular with the ground. In addition, the guidelines 742, 744 also extend perpendicularly from a virtual load connecting plane 706 disposed at the face of the load 702. The virtual load connecting plane 706 is perpendicular with the ground.

The third virtual alignment target image 740 representative of the preview path 742, 744 displayed on the screen 132 essentially provides a virtual directional heading image 740 superimposed on the viewable image of the loader based on the image obtained by the camera, wherein the virtual directional heading image is representative of a preview path on the screen of a movement path to be followed by a tool carrier of the loader for forward movement of the associated work vehicle.

Further in accordance with the example embodiment shown, the display unit 130 also displays an additional virtual alignment target set, such as the set 800 described above in connection with FIG. 7A, superimposed on the image of the workpiece and the implement attached with the tool carrier. The fourth virtual alignment target set of the example embodiment shown in FIG. 7D may include destination target indicia 890, 892 physically disposed on the workpiece as shown or superimposed on the image of the workpiece (not shown), and presence target indicia 850, 852 superimposed on the image of the implement attached with the tool carrier. The destination target indicia 890, 892 and the presence target indicia 850, 852 are representative of a preview path of movement on the screen to be followed by the associated work vehicle moving forward to effectively couple, prior to lifting the associated workpiece with the loader, the associated workpiece with the implement attached with the tool carrier portion for the presence target indicia 850, 852 being coincident with the destination target indicia 890, 892. The destination target indicia 890, 892 and the presence target indicia 850, 852 are disposed on the guidelines 742, 744 extending between virtual features 746, 748 of the implement or tool and geometrical features 747, 749 of the target or load 702 such as for example one or more physical features of the target or load such as the top opposite left and right edges of the load 702 offset from a physical coupling features 727, 729 (FIG. 7B) of the target or load 702.

Visual Aid Images Useful to Position Load to be Manipulated

Figure 8:
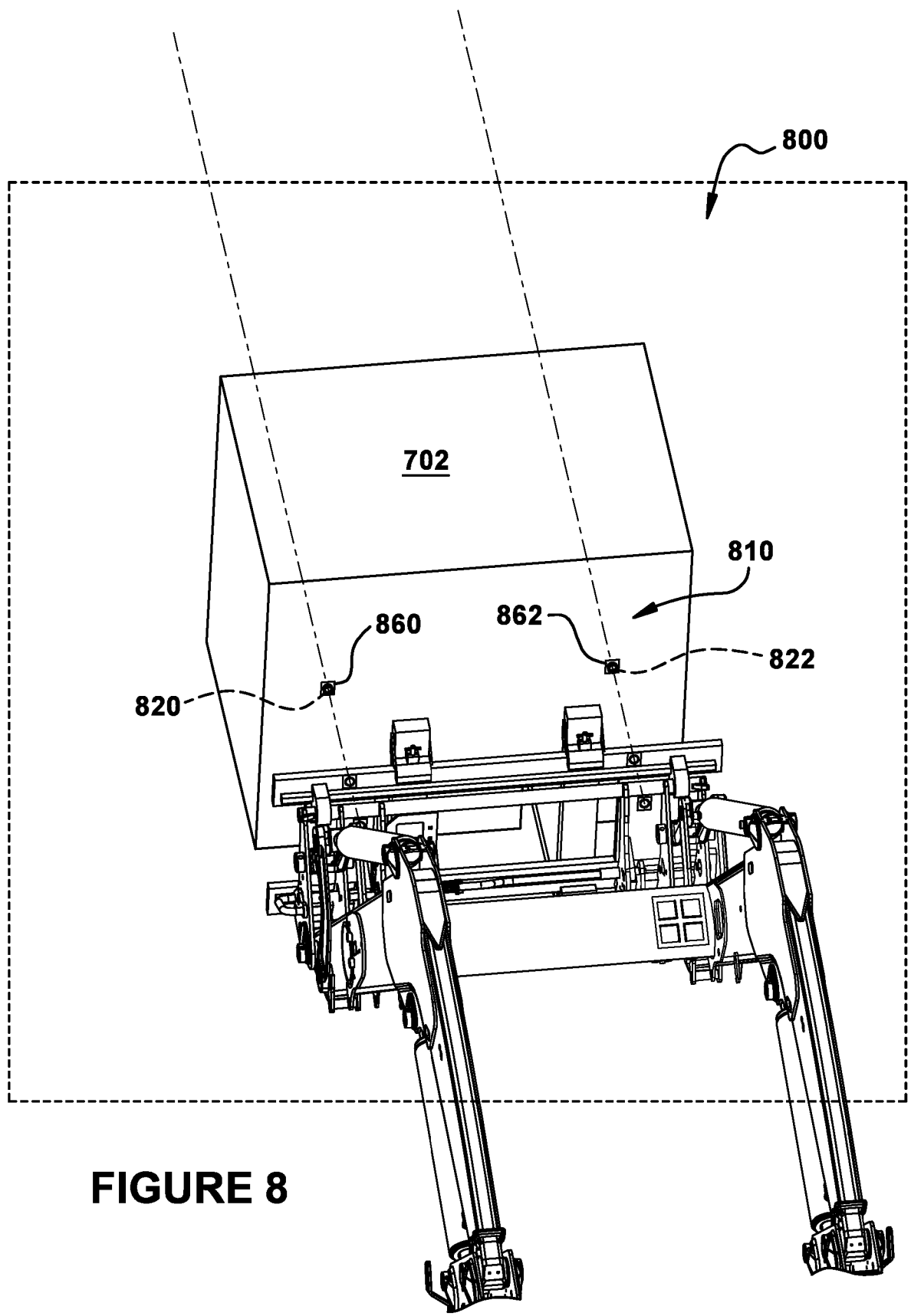
FIG. 8 shows further visual aids useful to position the implement attached with the tool carrier on the end of the boom relative to a load to be manipulated in accordance with an example embodiment.

FIG. 8 shows further visual aids useful to position the implement attached with the tool carrier on the end of the boom relative to a load to be manipulated in accordance with an example embodiment. With reference now to that Figure together with FIG. 7A and as described above, a camera device 121 mounted on the associated work vehicle is operable to obtain an image of the loader 10 of the associated work vehicle 1, and the display unit 130 displays the image 800 of the loader obtained by the camera device on the screen 132 of the display unit that is viewable from an operator's seat of the associated work vehicle. The display unit 130 also displays a fourth virtual alignment target 810 superimposed on the image of the workpiece and the implement attached with the tool carrier. The fourth virtual alignment target may include destination target indicia 860, 862 physically disposed on the workpiece as shown or superimposed on the image of the workpiece (not shown), and presence target indicia 820, 822 superimposed on the image of the implement attached with the tool carrier. The destination target indicia 860, 862 and the presence target indicia 820, 822 are representative of a preview path of movement on the screen to be followed by the associated work vehicle moving forward to effectively couple, prior to lifting the associated workpiece with the loader, the associated workpiece with the implement attached with the tool carrier portion for the presence target indicia 820, 822 being coincident with the destination target indicia 860, 862.

In accordance with the example embodiment, the vehicle operator may operate the work vehicle to move forward using as guidance the pair of spaced apart preview path guidelines 712, 714 described above until a coincidence is established on the display unit 130 between the presence target indicia 820, 822 and the destination target indicia 860, 862. In the example embodiment, the presence target indicia 820, 822 effectively moves together with the image on the display unit 130 of the loader and tool relative to the background surroundings being displayed and, similarly, the destination target indicia 860, 862 effectively remains stationary together with the image on the display unit 130 of the load 702 relative to the background surroundings being displayed. At the conclusion of movement of the work vehicle carrying the tool along the guidelines 712, 714 the coincidence is established on the display unit 130 between the presence target indicia 820, 822 and the destination target indicia 860, 862. This provides visual confirmation to the operator that the tractor and tool are properly positioned and/or otherwise aligned relative to the load, and that the load is ready for lifting with the tool on the loader.

In addition in accordance with the example embodiment, the virtual guidance apparatus includes an input 214 operatively coupled with the guidance control unit. The input may be used during a training of the virtual guidance apparatus for receiving destination and presence training signals representative of the preview path of movement on the screen to be followed by the associated work vehicle moving forward to effectively couple prior to lifting the associated workpiece with the loader the associated workpiece with the implement attached with the tool carrier portion for the presence target indicia being coincident with the destination target indicia. The training data received includes in the example embodiment data representative of the presence target indicia 820, 822 and data representative of the destination target indicia 860, 862.

In an example embodiment the input 214 may include a touchscreen portion of the display unit 130 or a pointer device 216 (FIG. 2) operatively coupled with the guidance control unit. The memory 210 of the guidance control unit 110 may store data corresponding to the destination and presence training signals and/or data received by the input during the training.

It is to be appreciated that the showings of FIG. 8 are equivalently applicable to embodiments herein wherein visual aids in the form of one or more preview paths are provided for assisting an operator of a work vehicle to visualize and align portions of a loader of a work vehicle and of material handling attachments detachably coupled to the loader relative to the work vehicle itself, relative to the ground under the work vehicle, and to help visualize the position of one or more attachments on the loader and of material to be loaded or manipulated such as to approach a load and/or tool, pick up the tool and/or the load using the tool, and deposit or otherwise place the load or any other material at a desired location such as at or on the ground at a selected location, at or on a storage rack, platform or the like.

Using FIG. 8 as a general template of embodiments herein wherein visual aids in the form of one or more preview paths are provided for assisting an operator of a work vehicle and with additional reference to FIG. 7B, in accordance with the example embodiments, the display unit 130 also displays an additional virtual alignment target set, such as the set 800 described above in connection with FIG. 7A, superimposed on the image of the workpiece and the implement attached with the tool carrier. The fourth virtual alignment target set of the example embodiment shown in FIG. 7B may include destination target indicia 870, 872 physically disposed on the workpiece as shown or superimposed on the image of the workpiece (not shown), and presence target indicia 830, 832 superimposed on the image of the implement attached with the tool carrier. The destination target indicia 870, 872 and the presence target indicia 830, 832 are representative of a preview path of movement on the screen to be followed by the associated work vehicle moving forward to effectively couple, prior to lifting the associated workpiece with the loader, the associated workpiece with the implement attached with the tool carrier portion. This desired end relative position is confirmed when there is a coincidence on the display unit 130 between the presence target indicia 830, 832 and the destination target indicia 870, 872. The destination target indicia 870, 872 and the presence target indicia 830, 832 are disposed on the guidelines 722, 724 extending between coupling features 726, 728 of the implement or tool 24 and coupling features 727, 729 of the target or load 702.

With continued use of FIG. 8 as a general template of embodiments herein wherein visual aids in the form of one or more preview paths are provided for assisting an operator of a work vehicle and with additional reference to FIG. 7C, in accordance with the example embodiments, the display unit 130 also displays an additional virtual alignment target set, such as the set 800 described above in connection with FIG. 7A, superimposed on the image of the workpiece and the implement attached with the tool carrier. The fourth virtual alignment target set of the example embodiment shown in FIG. 7C may include destination target indicia 880, 882 physically disposed on the workpiece as shown or superimposed on the image of the workpiece (not shown), and presence target indicia 840, 842 superimposed on the image of the implement attached with the tool carrier. The destination target indicia 880, 882 and the presence target indicia 840, 842 are representative of a preview path of movement on the screen to be followed by the associated work vehicle moving forward to effectively couple, prior to lifting the associated workpiece with the loader, the associated workpiece with the implement attached with the tool carrier portion. This desired end relative position is confirmed when there is a coincidence on the display unit 130 between the presence target indicia 840, 842 and the destination target indicia 880, 882. The destination target indicia 880, 882 and the presence target indicia 840, 842 are disposed on the guidelines 732, 734 extending between geometrical features 736, 738 of the implement or tool 24 and physical features 737, 739 of the target or load 702.

With continued use of FIG. 8 as a general template of embodiments herein wherein visual aids in the form of one or more preview paths are provided for assisting an operator of a work vehicle and with additional reference to FIG. 7D, in accordance with the example embodiments, the display unit 130 also displays an additional virtual alignment target set, such as the set 800 described above in connection with FIG. 7A, superimposed on the image of the workpiece and the implement attached with the tool carrier. The fourth virtual alignment target set of the example embodiment shown in FIG. 7D may include destination target indicia 890, 892 physically disposed on the workpiece as shown or superimposed on the image of the workpiece (not shown), and presence target indicia 850, 852 superimposed on the image of the implement attached with the tool carrier. The destination target indicia 890, 892 and the presence target indicia 850, 852 are representative of a preview path of movement on the screen to be followed by the associated work vehicle moving forward to effectively couple, prior to lifting the associated workpiece with the loader, the associated workpiece with the implement attached with the tool carrier portion for the presence target indicia 850, 852 being coincident with the destination target indicia 890, 892. The destination target indicia 890, 892 and the presence target indicia 850, 852 are disposed on the guidelines 742, 744 extending between virtual features 746, 748 of the implement or tool and geometrical features 747, 749 of the target or load 702 such as for example one or more physical features of the target or load such as the top opposite left and right edges of the load 702 offset from a physical coupling features 727, 729 (FIG. 7B) of the target or load 702.

As described above and in accordance with further example embodiments, the visual aid images showing the one or more preview paths are provided in the form of guidelines extending between a physical feature of the load or of the tool such as a physical marker on the load or tool and a physical feature of a load placement location such as a physical marker disposed on a rack, shelf or the like configured to receive the load therein or thereon. In a further embodiment, the preview of the path is representative of a direct virtual path of the tool or of the load carried by the tool. In an embodiment the preview path is provided in the form of guidelines extending between a coupling feature of the tool or load and a coupling feature of the load placement location. In a still further embodiment, the preview of the path is representative of an indirect virtual path of a load attached or otherwise carried by the tool that is not directly physically visible to the operator, wherein the operator may operate the work vehicle based on the displayed virtual path preview for correctly moving the workpiece load carried by the load relative to the load placement location. In an embodiment the preview path is provided in the form of guidelines extending between a geometrical feature of the load or tool and a physical feature of the load placement location such as a physical marker disposed on a rack, shelf or the like configured to receive the load therein or thereon. In a further embodiment the preview path is provided in the form of guidelines extending between a virtual feature of the load or tool and a geometrical feature of the load placement location such as a physical feature of the placement location offset from a physical structure or area of the placement location. In an embodiment, the visual aid images showing the one or more preview paths are provided in the form of guidelines extending between a physical feature of the load or tool such as a physical marker on the implement or tool and a physical feature of the load placement location such as a physical marker on the target load placement location. In a further embodiment, the preview of the path is representative of a direct virtual path of the tool or of a load carried by the tool. In an embodiment the preview path is provided in the form of guidelines extending between a coupling feature of the load or tool and a coupling feature of the load placement location. In a still further embodiment, the preview of the path is representative of an indirect virtual path of a load carried by the tool that is not directly physically visible to the operator, wherein the operator may operate the work vehicle based on the displayed virtual path preview for correctly moving the load relative to the load placement location. In an embodiment the preview path is provided in the form of guidelines extending between a geometrical feature of the load or tool and a physical feature of the target load placement location such as a physical marker disposed on a rack, shelf or the like configured to receive the load therein or thereon. In a further embodiment the preview path is provided in the form of guidelines extending between a virtual feature of the load tool and a geometrical feature of the target load placement location such as a physical feature of the target load placement location offset from a physical coupling feature of the load placement location.

Virtual Guidance Method

Figure 9:
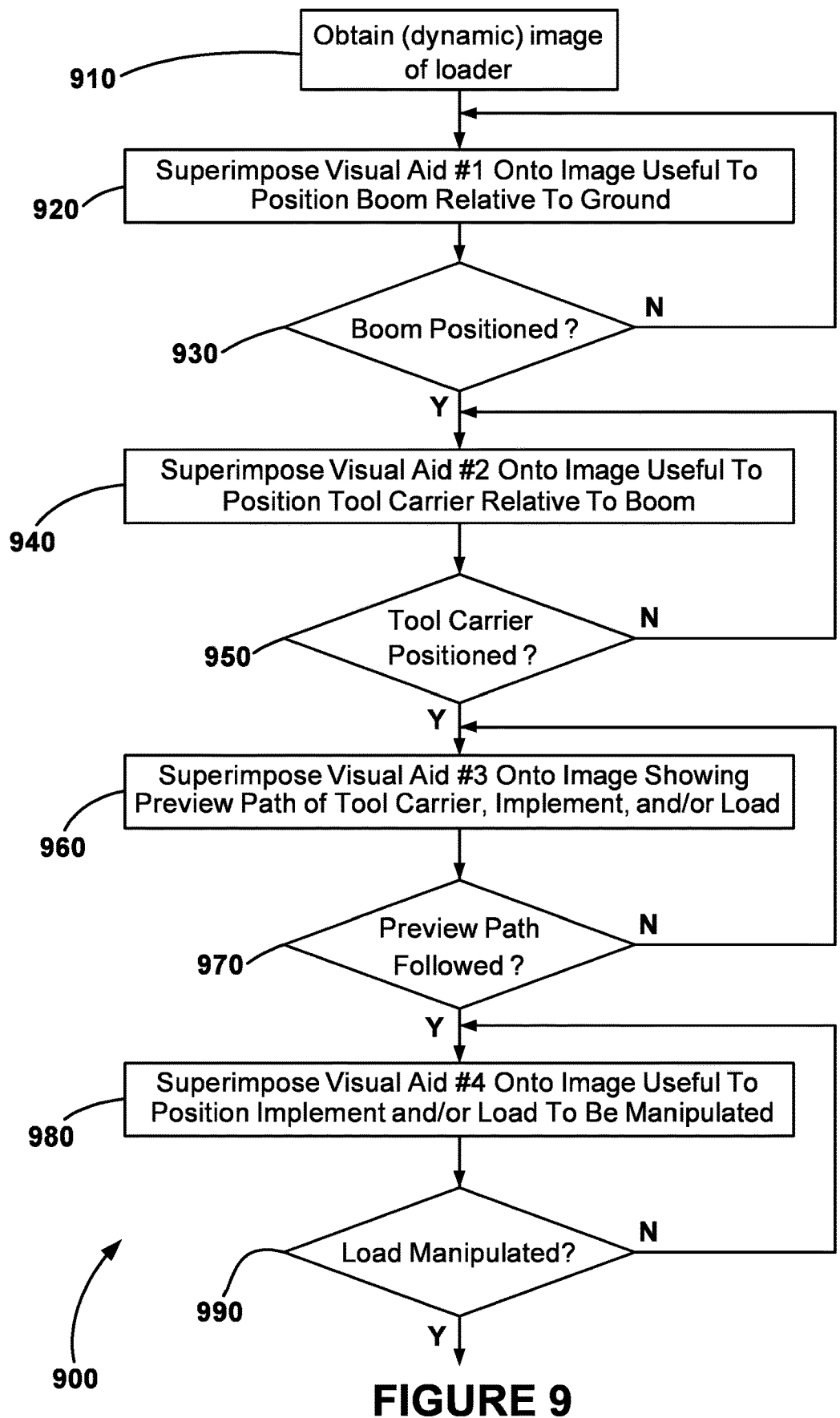
FIG. 9 is a flow diagram showing a virtual guidance method for assisting an operator of an associated work vehicle to maneuver portions of the associated work vehicle for material handling of an associated workpiece in accordance with an example embodiment.

FIG. 9 is a flow diagram showing a virtual guidance method 900 for assisting an operator of an associated work vehicle to maneuver portions of the associated work vehicle for material handling of an associated workpiece in accordance with an example embodiment.

The virtual guidance method 900 comprises obtaining 910 by a camera device mounted on the associated work vehicle an image of a loader of the associated work vehicle and, in particular, to obtaining the image of the loader of the associated work vehicle in the context of the surroundings particularly the surroundings where the implement attached with the tool carrier will be performing the work; and displaying 920 on a screen of a display unit such as for example an overhead display that is viewable from an operator's seat of the associated work vehicle and that is operatively coupled with a guidance control unit comprising a processor and a memory operatively coupled with the processor: the image of the loader of the associated work vehicle obtained by the camera device; and a first virtual alignment target superimposed on the image of the loader obtained by the camera, the first virtual alignment target being representative of a first predetermined target location on the screen for alignment of a first visual marker portion of the image of the loader, wherein movement of the loader relative to the associated work vehicle to establish a coincidence between the first visual marker portion of the image of the loader displayed on the screen and the first predetermined target location on the screen corresponds to a first predetermined relative physical position between: the loader and the associated work vehicle; and/or the loader and ground supporting the associated work vehicle.

If the boom is determined in step 930 to be properly positioned based on the above, the virtual guidance method further comprises displaying 940 on the screen of the display unit: a second virtual alignment target superimposed on the image of the loader obtained by the camera, the second virtual alignment target being representative of a second predetermined target location on the screen for alignment of a tool carrier portion of the image of the loader, wherein movement of the tool carrier portion of the loader relative to the associated work vehicle to establish a coincidence between the tool carrier portion of the image of the loader displayed on the screen and the second predetermined target location on the screen corresponds to a first predetermined relative physical position between the tool carrier portion of the loader and the ground supporting the associated work vehicle.

If the tool carrier is determined in step 950 to be properly positioned, the virtual guidance method further comprises displaying 960 on the screen of the display unit: a third virtual alignment target superimposed on the image of the loader obtained by the camera, the third virtual alignment target being representative of a preview path on the screen of movement to be followed by a tool carrier portion of the image of the loader for forward movement of the associated work vehicle towards tool or implement for coupling the tool or implement with the tool carrier. In a further example embodiment the third virtual alignment target is representative of preview path on the screen of movement to be followed by a tool or implement portion of the image of the loader for forward movement of the associated work vehicle towards a load or workpiece such as for example after the tool is coupled so that the load may be properly approached and lifted. In a further example embodiment the third virtual alignment target is representative of preview path on the screen of movement to be followed by a load or workpiece carried on the tool or implement portion of the image of the loader for forward movement of the associated work vehicle carrying the load towards the load placement location such as a rack or the like. In a further example embodiment the third virtual alignment target is representative of preview path on the screen of movement to be followed by a tool or implement portion of the image of the loader for forward movement of the associated work vehicle towards a load or workpiece at a load placement location such as when seeking to retrieve a load from a storage location.

As shown in FIG. 8 for example, a virtual load engagement target image 810 is superimposed on the viewable image of the workpiece and tool carrier. The virtual load engagement target image includes destination target indicia 860, 862 superimposed on the image of the workpiece and presence target indicia 820, 822 superimposed on the image of the tool carrier. The destination and presence target indicia are representative of preview paths of movement on the screen to be followed by the associated work vehicle moving forward to, for example, effectively couple prior to lifting the associated workpiece with the loader the associated workpiece with an implement on the tool carrier for the presence target indicia 820, 822 being coincident with the destination target indicia 860, 862 in the viewable image. In addition, the destination and presence target indicia are representative in an example embodiment of preview paths of movement on the screen to be followed by the associated work vehicle moving forward to, for example, effectively place the tool and load in proper alignment for lifting the load. In addition, the destination and presence target indicia are representative in an example embodiment of preview paths of movement on the screen to be followed by the associated work vehicle moving forward to, for example, effectively place the load in proper alignment for lifting the load.

If the operator determines in step 970 that the preview path was followed, the virtual guidance method further comprises: obtaining by the camera device an image of the tool carried on the loader of the associated work vehicle; obtaining by the camera device an image of the associated workpiece adjacent to the tool; and displaying 980 on the screen of the display unit: the image of the tool carried on the loader of the associated work vehicle obtained by the camera device; the image of the associated workpiece adjacent to the tool; and a fourth virtual alignment target superimposed on the image of the workpiece and tool carrier, the fourth virtual alignment target comprising destination target indicia superimposed on the image of the workpiece and presence target indicia superimposed on the image of the tool or tool carrier, the destination and presence target indicia being representative of a preview path of movement on the screen to be followed by the associated work vehicle moving forward to effectively couple prior to lifting the associated workpiece with the loader the associated workpiece with the tool portion for the presence target indicia being coincident with the destination target indicia.

The virtual guidance method further comprises: obtaining by the camera device an image of the load carried by the tool; obtaining by the camera device an image of the associated storage location; and displaying 980 on the screen of the display unit: the image of the load, the image of the storage location; and a fourth virtual alignment target superimposed on the image of the load and storage location, the fourth virtual alignment target comprising destination target indicia superimposed on the image of the storage location and presence target indicia superimposed on the image of the load, the destination and presence target indicia being representative of a preview path of movement on the screen to be followed by the associated work vehicle moving forward to effectively place the load into or on the storage location such as a rack for example, for the presence target indicia being coincident with the destination target indicia.

If it is determined in step 990 that the tool carrier was properly manipulated relative to the tool or implement, that the tool was properly manipulated relative to the load, and/or that the load was properly manipulated relative to the storage location, the method ends, concludes, or is terminated.

It is to be understood that other embodiments will be utilized and structural and functional changes will be made without departing from the scope of the present invention. The foregoing descriptions of embodiments of the present invention have been presented for the purposes of illustration and description. It is not intended to be exhaustive or to limit the invention to the precise forms disclosed. Accordingly, many modifications and variations are possible in light of the above teachings. It is therefore intended that the scope of the invention be limited not by this detailed description.

The invention claimed is:

1. A virtual guidance apparatus for assisting movement of a loader carried on an associated tractor to a desired position, the apparatus comprising:
   a guidance control unit comprising:
      a processor; and
      a memory device operatively coupled with the processor, the memory device storing logic executable by the processor;
   a first set of one or more target devices configured to be carried on the loader; and
   a camera device operatively coupled with the guidance control unit, the camera device being operable to generate first target image data representative of an image of the first set of one or more target devices,
   wherein the processor of the guidance control unit is configured to execute the logic to:
      determine one or more of a pose, an inclination, and/or an orientation of the loader based on the generated first target image data representative of the image of the first set of one or more target devices; and
      determine the loader being disposed in the desired position based on the determined one or more of the pose, the inclination, and/or the orientation of the loader.

2. The virtual guidance apparatus according to claim 1, wherein:
   the first set of one or more target devices comprises a boom target device configured to be carried on a boom of the loader, and a carrier target device configured to be carried on a tool carrier portion of the loader;
   the camera device is operable to generate the first target image data representative of the image of the first set of one or more target devices comprising the boom and carrier target devices; and the processor of the guidance control unit is configured to execute the logic to:
   determine one or more of a pose, an inclination, and/or an orientation of one or more of the boom of the loader and/or the tool carrier portion of the loader based on the generated first target image data representative of the image of the first set of one or more target devices comprising the boom and carrier target devices; and
   determine the one or more of the boom of the loader and/or the tool carrier portion of the loader being disposed in the desired position based on the determined one or more of a pose, an inclination, and/or an orientation of one or more of the boom of the loader and/or the tool carrier portion of the loader.

3. The virtual guidance apparatus according to claim 1, wherein:
   the processor of the guidance control unit is configured to execute the logic to:
      determine one or more of a pose, an inclination, and/or an orientation of the loader relative to the associated tractor based on the generated first target image data representative of the image of the first set of one or more target devices; and
      determine the loader being disposed in the desired position based on the determined one or more of the pose, the inclination, and/or the orientation of the loader relative to the associated tractor.

4. The virtual guidance apparatus according to claim 1, wherein:
   the processor of the guidance control unit is configured to execute the logic to:
      determine one or more of a pose, an inclination, and/or an orientation of the loader relative to ground supporting the associated tractor based on the generated first target image data representative of the image of the first set of one or more target devices; and
      determine the loader being disposed in the desired position based on the determined one or more of the pose, the inclination, and/or the orientation of the loader relative to ground supporting the associated tractor.

5. The virtual guidance apparatus according to claim 1, wherein:
   the first set of one or more target devices comprises signage comprising positional indicia located at one or more predefined locations on the signage;
   the camera device is operable to generate positional indicia data representative of an image of the positional indicia of the signage; and
   the processor of the guidance control unit is configured to execute the logic to determine the one or more of the pose, the inclination, and/or the orientation of the loader based on the generated positional indicia data representative of the image of the positional indicia of the signage.

6. The virtual guidance apparatus according to claim 5 wherein:
   the signage comprising the positional indicia comprises a quick response (QR) code label comprising position patterns at corners of the QR code label.

7. The virtual guidance apparatus according to claim 1, wherein:
   the processor of the guidance control unit is configured to execute the logic to:
      generate a control signal controlling one or more cylinders of the loader based on the generated first target image data representative of the image of the first set of one or more target devices to return the loader from a position other than the desired position to the desired position in response to a return to position (RTP) command received by the virtual guidance apparatus.

8. The virtual guidance apparatus according to claim 1, further comprising:
a display unit operatively coupled with the guidance control unit, the display unit comprising a screen that is viewable by an operator of the associated tractor, the display unit being operable to display a viewable image of the loader based on loader image data generated by the camera device, the loader image data being representative of an image of the loader,
wherein the display unit is operable to display on the screen a visual aid image superimposed on the viewable image of the loader for assisting the operator position the loader.

9. The virtual guidance apparatus according to claim 8, wherein:
the display unit is operative to display on the screen:
a virtual tool connecting plane as the visual aid image, the virtual tool connecting plane being superimposed on the viewable image of the loader at a tool carrier portion of the viewable image of the loader displayed on the screen for assisting the operator position the loader relative to an associated tool.

10. The virtual guidance apparatus according to claim 9, wherein:
the display unit is operable to display on the screen:
a virtual directional heading image superimposed on the viewable image of the loader based on the loader image data representative of the image of the loader obtained by the camera device, the virtual directional heading image being representative of a pair of spaced apart preview path guidelines of movement paths on the screen to be followed by one or more of:
tines of a pallet fork implement on the tool carrier of the loader for forward movement of the associated work vehicle; and/or
a surface of the tool carrier acting as a pilot for the forward movement of the associated work vehicle,
wherein the pair of spaced apart preview path guidelines of the movement paths displayed on the screen and the virtual tool connecting plane displayed on the screen are visually represented on the screen as being mutually perpendicular.

11. The virtual guidance apparatus according to claim 8, further comprising:
a second set of one or more target devices configured to be carried on a face of an associated structure,
wherein the camera device is operable to generate second target image data representative of an image of the second set of one or more target devices,
wherein the processor of the guidance control unit is configured to execute the logic to:
determine one or more of a pose, an inclination, and/or an orientation of the face of the associated structure based on the generated second target image data representative of the image of the second set of one or more target devices,
wherein the display unit is operative to display on the screen:
a virtual structure connecting plane as the visual aid image superimposed on a viewable image of the structure at the face of the associated structure and perpendicular to ground supporting the associated tractor for assisting the operator position the loader relative to the associated structure.

12. The virtual guidance apparatus according to claim 8, wherein:
the camera device is operable to generate workpiece image data representative of an image of an associated workpiece,
the display unit is operable to display a viewable image of the associated workpiece based on the generated workpiece image data,
the display unit is operable to display on the screen:
destination target indicia superimposed on the viewable image of the associated workpiece; and
presence target indicia superimposed on the viewable image of the loader,
wherein the destination target indicia and the presence target indicia are representative of a preview path of movement on the screen to be followed by the associated work vehicle moving forward to effectively couple, prior to lifting the associated workpiece with the loader, the associated workpiece with an implement attached with a tool carrier portion of the loader for the presence target indicia being coincident with the destination target indicia as the loader being disposed in the desired position.

13. A virtual guidance method for assisting an operator of an associated work vehicle to maneuver portions of the associated work vehicle to a desired position for material handling of an associated workpiece, the virtual guidance method comprising:
generating by a camera device first target image data representative of an image of a first set of one or more physical target devices carried on a loader of the associated work vehicle; and
determining by a processor of a guidance control unit operatively coupled with the camera device and comprising a memory device storing logic executable by the processor:
one or more of a pose, an inclination, and/or an orientation of the loader based on the generated first target image data representative of the image of the first set of one or more physical target devices; and
the loader being disposed in the desired position based on the determined one or more of the pose, the inclination, and/or the orientation of the loader.

14. The virtual guidance method according to claim 13, further comprising:
generating by the camera device first target image data representative of an image of the first set of one or more target devices comprising a boom target device configured to be carried on a boom of the loader, and a carrier target device configured to be carried on a tool carrier portion of the loader; and
executing the logic by the processor to:
determine one or more of a pose, an inclination, and/or an orientation of one or more of the boom of the loader and/or the tool carrier portion of the loader based on the generated first target image data representative of the image of the first set of one or more target devices comprising the boom and carrier target devices; and
determine the one or more of the boom of the loader and/or the tool carrier portion of the loader being disposed in the desired position based on the determined one or more of a pose, an inclination, and/or an orientation of one or more of the boom of the loader and/or the tool carrier portion of the loader.

15. The virtual guidance method according to claim 13, further comprising:
   executing the logic by the processor to:
      determine one or more of a pose, an inclination, and/or an orientation of the loader relative to the associated tractor based on the generated first target image data representative of the image of the first set of one or more physical target devices; and
      determine the loader being disposed in the desired position based on the determined one or more of the pose, the inclination, and/or the orientation of the loader relative to the associated tractor.

16. The virtual guidance method according to claim 13, further comprising:
   executing the logic by the processor to:
      determine one or more of a pose, an inclination, and/or an orientation of the loader relative to ground supporting the associated tractor based on the generated first target image data representative of the first set of one or more first physical target devices; and
      determine the loader being disposed in the desired position based on the determined one or more of the pose, the inclination, and/or the orientation of the loader relative to ground supporting the associated tractor.

17. The virtual guidance method according to claim 13, wherein:
   the generating the first target image data representative of the first set of one or more first physical target devices carried on the loader of the associated work vehicle comprises generating positional indicia image data representative of an image of positional indicia of signage comprising the positional indicia located at one or more predefined locations on the signage; and
   the determining the one or more of the pose, the inclination, and/or the orientation of the loader comprises determining the one or more of the pose, the inclination, and/or the orientation of the loader based on the generated positional indicia data representative of the image of the positional indicia of the signage.

18. The virtual guidance method according to claim 17, wherein:
   the generating the positional indicia data comprises generating quick response (QR) code label image data representative of an image of a QR code label comprising position patterns at corners of the QR code label.

19. The virtual guidance method according to claim 13, further comprising:
   executing the logic by the processor of the guidance control unit to:
      generate a control signal controlling one or more cylinders of the loader based on the generated first target image data representative of the first set of one or more physical target devices to return the loader from a position other than the desired position to the desired position in response to a return to position (RTP) command received by the virtual guidance apparatus.

20. The virtual guidance method according to claim 13, further comprising:
   displaying on a screen of a display unit operatively coupled with the guidance control unit a viewable image of the loader based on loader image data generated by the camera device, the loader image data being representative of an image of the loader; and
   displaying on the screen a visual aid image superimposed on the viewable image of the loader for assisting the operator of the associated work vehicle position the loader.

21. The virtual guidance method according to claim 20, further comprising:
   displaying on the screen of the display unit:
      a virtual tool connecting plane as the visual aid image superimposed on the viewable image of the loader at a tool carrier portion of the viewable image of the loader displayed on the screen for assisting the operator position the loader relative to an associated tool.

22. The virtual guidance method according to claim 21, further comprising:
   displaying on the screen of the display unit:
   a virtual directional heading image superimposed on the viewable image of the loader based on the loader image data generated by the camera, the virtual directional heading image being representative of a pair of spaced apart preview path guidelines of movement paths on the screen to be followed by one or more of:
      tines of a pallet fork implement on the tool carrier of the loader for forward movement of the associated work vehicle; and/or
      a surface of the tool carrier acting as a pilot for the forward movement of the associated work vehicle,
   wherein the pair of spaced apart preview path guidelines of the movement paths displayed on the screen and the virtual tool connecting plane displayed on the screen are visually represented on the screen as being mutually perpendicular.

23. The virtual guidance method according to claim 20, further comprising:
   generating by the camera device second target image data representative of an image of a second set of one or more physical target devices carried on a face of an associated structure;
   executing the logic by the processor of the guidance control unit to:
      determine one or more of a pose, an inclination, and/or an orientation of the face of the associated structure based on the generated second target image data representative of the image of the second set of one or more physical target devices; and
   displaying on the screen of the display unit:
      a virtual structure connecting plane as the visual aid image superimposed on a viewable image of the structure at the face of the associated structure and perpendicular to ground supporting the associated tractor for assisting the operator position the loader relative to the associated structure.

24. The virtual guidance method according to claim 20, further comprising:
   generating by the camera device workpiece image data representative of an image of an associated workpiece;
   displaying on the screen of the display unit:
      destination target indicia superimposed on the viewable image of the associated workpiece; and
      presence target indicia superimposed on the viewable image of the loader,
      wherein the destination target indicia and the presence target indicia are representative of a preview path of movement on the screen to be followed by the associated work vehicle moving forward to effectively couple, prior to lifting the associated workpiece with the loader, the associated workpiece with an implement attached with a tool carrier portion of the loader for the presence target indicia being coincident with the destination target indicia as the loader being disposed in the desired position.

* * * * *